(12) United States Patent
Kakkireni et al.

(10) Patent No.: US 12,099,397 B2
(45) Date of Patent: Sep. 24, 2024

(54) EXTENDED POWER THRESHOLD MANAGEMENT OF POWER RAILS

(71) Applicant: QUALCOMM Incorporated, San Diego, CA (US)

(72) Inventors: Prashanth Kumar Kakkireni, Bengaluru (IN); Matthew Severson, Austin, TX (US); Ravi Jenkal, San Diego, CA (US); Gordon Lee, Gilbert, AZ (US); Kevin Bradley Citterelle, Leander, TX (US); Ronald Alton, Oceanside, CA (US); Anish Muttreja, Pittsford, NY (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 18/069,537

(22) Filed: Dec. 21, 2022

(65) Prior Publication Data

US 2024/0211021 A1 Jun. 27, 2024

(51) Int. Cl.
  *G06F 1/32* (2019.01)
  *G06F 1/3296* (2019.01)
(52) U.S. Cl.
  CPC ................................. *G06F 1/3296* (2013.01)
(58) Field of Classification Search
  CPC .................................................... G06F 1/3296
  See application file for complete search history.

(56) References Cited

U.S. PATENT DOCUMENTS

| 10,084,450 | B1* | 9/2018 | Cox | H03K 5/01 |
| 2012/0272086 | A1 | 10/2012 | Anderson et al. | |
| 2016/0013643 | A1* | 1/2016 | Park | G06F 1/28 |
| | | | | 713/300 |
| 2024/0077924 | A1* | 3/2024 | Mosalikanti | G01R 19/16552 |

OTHER PUBLICATIONS

International Search Report and Written Opinion—PCT/US2023/036252—ISA/EPO—Feb. 2, 2024. 13 pages.

* cited by examiner

*Primary Examiner* — Stefan Stoynov
(74) *Attorney, Agent, or Firm* — The Marbury Law Group

(57) ABSTRACT

Various embodiments include power management system methods including receiving, at a processor(s), a notification signal triggering the processor(s) to implement power usage mitigation at the processor(s), determining, by the processor(s), a mitigation amount of power rail power by which to mitigate current usage at a power rail based on a use case for the power rail, and implementing power usage mitigation at the processor(s) by the processor(s) sufficient to mitigate power usage at the power rail by the mitigation amount of power rail power. Power usage mitigation may include reducing processor(s) current usage: by a predefined amount; proportional to the amount a power rail current exceeds a power rail current threshold; by the amount of current exceeding a processor current threshold; or by a smallest amount between the amount a power rail current exceeds a power rail current threshold and the processor(s) current exceeds a processor current threshold.

30 Claims, 13 Drawing Sheets

| Extended Current Condition | Power Rail Current | | Processor Current | | Processor Response |
|---|---|---|---|---|---|
| | Available | Condition | Available | Condition | |
| No Notification Signal | Yes | Current < Extended Current Threshold | Yes Or No | | No Current Mitigation |
| No Notification Signal | Yes Or No | | Yes | Current < Extended Current Threshold | No Current Mitigation |
| No Notification Signal | No | | No | | Processor Max. Frequency Of Operation Is Capped |
| No Notification Signal | No | | Yes | Current > Extended Current Threshold | Reduce Processor Current Below Extended Current Threshold |
| No Notification Signal | Yes | Current > Extended Current Threshold | No | | Reduce Processor Current By Predefined % So Processor Current < Extended Current Threshold |
| No Notification Signal | Yes | Current > Extended Current Threshold | Yes | Current > Extended Current Threshold | Reduce Processor Current So Power Rail Current Below Extended Current Threshold |
| Notification Signal | Yes | Current < Current Threshold | Yes Or No | | No Current Mitigation |
| Notification Signal | Yes Or No | | Yes | Current < Current Threshold | No Current Mitigation |
| Notification Signal | No | | No | | Reduce Processor Current By Predefined % So Power Rail Current < Extended Current Threshold |
| Notification Signal | Yes | Current > Extended Current Threshold | No | | Reduce Processor Current Proportional To Power Rail Current Violation |
| Notification Signal | No | | Yes | Current > Current Threshold | Reduce Processor Current Based On Processor Current Violation |
| Notification Signal | Yes | | Yes | Current > Current Threshold | Reduce Processor Current Based On Minimum Of Power Rail Current & Processor Current Violations |

FIG. 5

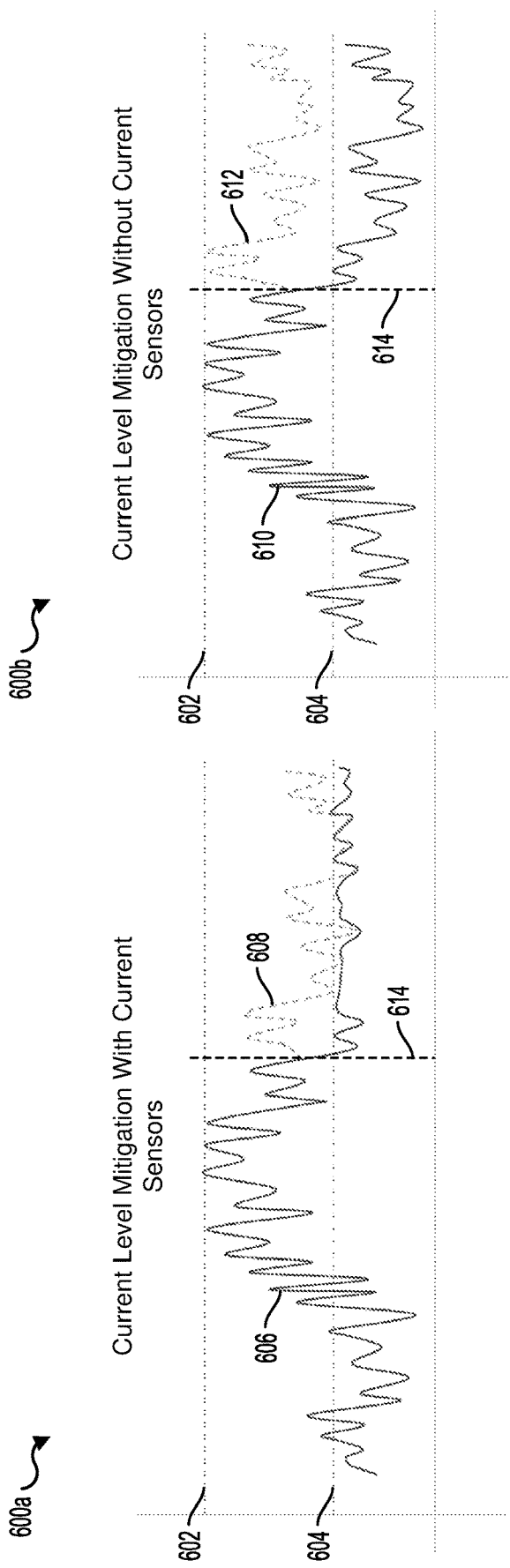

EXTENDED POWER THRESHOLD MANAGEMENT OF POWER RAILS

BACKGROUND

Power management integrated circuits (power management ICs or PMICs) are used for managing the power requirements of host systems. A PMIC may manage a rail current provided to a system on chip (SoC), including allowing rail current to exceed a current threshold, such as up to an extended rail current threshold. The rail current may be provided to processors of the SoC so that the processors may operate. The rail current above the current threshold and below the extended rail current threshold can be provided to the processors to allow the processors to perform at levels greater than performance levels for the rail current at or below the current threshold.

SUMMARY

Various aspects may include apparatuses and methods for implementing extended power threshold management of shared power rails. Various aspects may include receiving, at a plurality of processors from a power management integrated circuit, a notification signal triggering each of the plurality of processors to implement power usage mitigation at each of the plurality of processors, determining, by the at least one processor, a mitigation amount of power rail power by which to mitigate power usage at a power rail based on a use case for the power rail, and implementing, by the at least one processor, power usage mitigation at each of the plurality of processors by each of the plurality of processors sufficient to mitigate power usage at the power rail by the mitigation amount of power rail.

Some aspects may further include determining, by the at least one processor, whether a processor current of the at least one processor exceeds a processor current threshold, in which implementing power usage mitigation at the at least one processor includes implementing current usage mitigation at the at least one processor in response to determining that the processor current of the at least one processor exceeds the processor current threshold.

In some aspects, implementing the power usage mitigation at the at least one processor may include reducing current usage of the at least one processor by a predefined amount sufficient to reduce a power rail current to less than a power rail current threshold. In some aspects, implementing the power usage mitigation at the at least one processor may include reducing current usage of the at least one processor by an amount proportional to an amount by which a power rail current exceeds a power rail current threshold. In some aspects, implementing the power usage mitigation at the at least one processor may include reducing current usage of the at least one processor by an amount by which a processor current of the at least one processor exceeds a processor current threshold. In some aspects, implementing the power usage mitigation at the at least one processor may include reducing current usage of the at least one processor by a smallest amount between an amount by which a power rail current exceeds a power rail current threshold and an amount by which a processor current of the at least one processor exceeds a processor current threshold.

In some aspects, implementing the power usage mitigation at the at least one processor may include implementing the current usage mitigation within a processor current usage mitigation period. In some aspects, implementing the power usage mitigation at the at least one processor may include reducing current usage of the at least one processor by one or a combination of reducing a frequency of the at least one processor and reducing a workload of the at least one processor. In some aspects, implementing the power usage mitigation at the at least one processor may include allowing any current usage of the at least one processor for a power rail current up to an extended rail current threshold. In some aspects, implementing the power usage mitigation at the at least one processor may include allowing current usage of the at least one processor to exceed a processor current threshold up to an extended processor current threshold.

In some aspects, receiving the notification signal triggering the at least one processor to implement power usage mitigation at the at least one processor may include receiving, at a plurality of processors from the power management integrated circuit, the notification signal triggering the plurality of processor to implement power usage mitigation at each respective processor of the plurality of processors, in which the plurality of processors includes the at least one processor. In such aspects, determining the mitigation amount of power rail power by which to mitigate power usage at the power rail based on the use case for the power rail may include determining, by the respective processors of the plurality of processors, the mitigation amount of power rail power by which to mitigate power usage at the power rail based on the use case for the power rail, and implementing the power usage mitigation at the at least one processor sufficient to mitigate power usage at the power rail by the mitigation amount of power rail power may include implementing the power usage mitigation at respective processors of the plurality of processors sufficient to mitigate power usage at the power rail by the mitigation amount of power rail power.

Some aspects may further include monitoring power transmitted through the power rail by the power management integrated circuit; and sending the notification signal to the at least one processor in response to power transmitted through the power rail exceeding a threshold.

In some aspects, implementing the power usage mitigation at the at least one processor includes reducing one of current, voltage, or current and voltage applied to the at least one processor by a predefined amount sufficient to reduce power in a power rail to less than a power rail power threshold.

Further aspects include computing devices including a plurality of processors configured to perform operations of any of the methods summarized above. Further aspects include computing devices having means for performing any of the functions of the methods summarized above. Further aspects include a power management integrated circuit configured to perform any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIG. 5 is a table diagram illustrating examples of extended electrical threshold management for implementing various embodiments.

FIGS. 6A and 6B are graph diagrams illustrating examples of extended electrical threshold management for implementing various embodiments.

DETAILED DESCRIPTION

Figure 1:
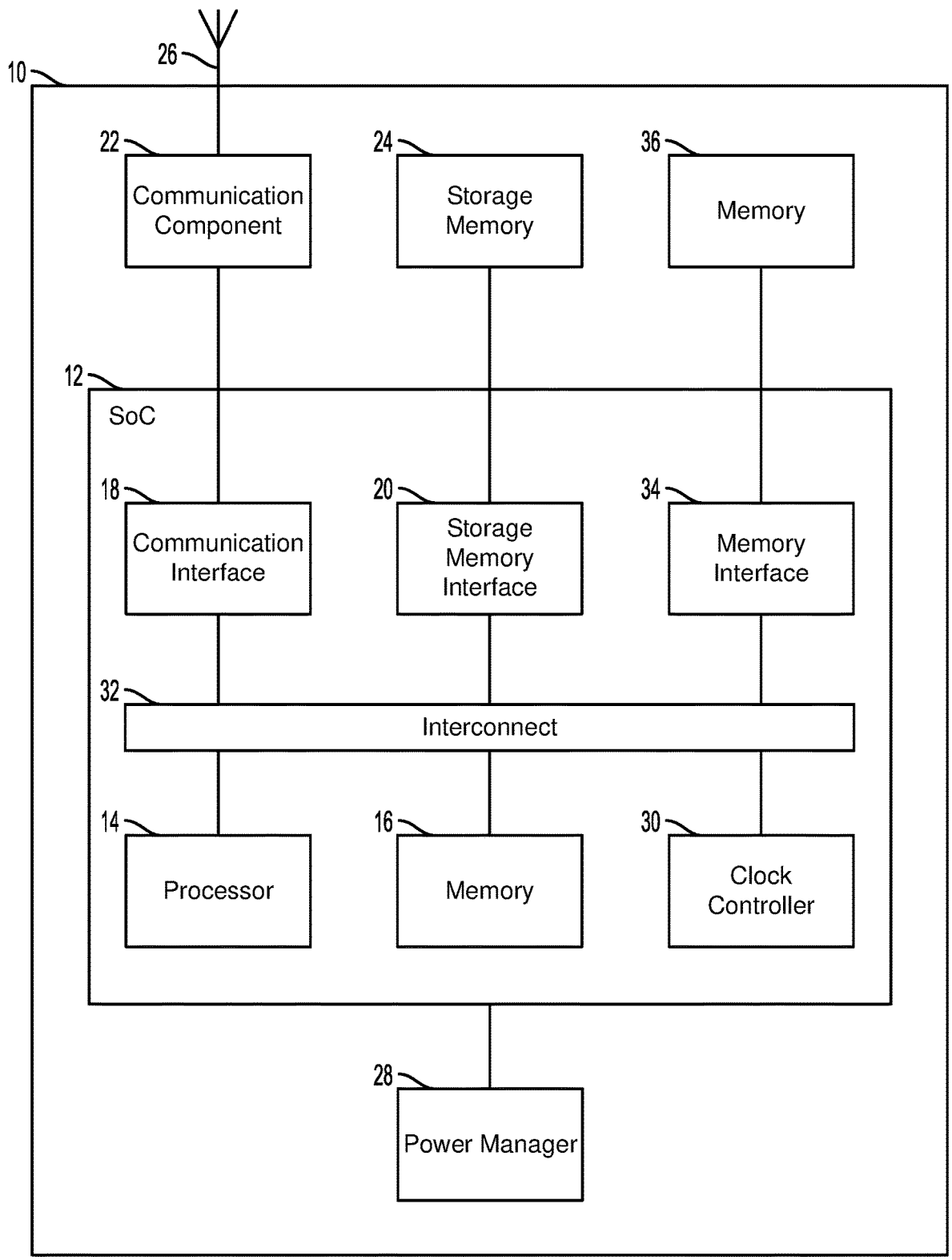
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods for implementing extended current threshold management in a power management system of a computing device for one or more processors receiving current from a power rail. Some embodiments include implementing current usage mitigation in response to a signal triggering to the one or more processors to mitigate current levels to reduce a current of the power rail. In some embodiments, mitigating the current levels of the processors may depend on whether the current of the shared power rail exceeds a rail current threshold and/or currents of the one or more processors exceed processor current thresholds.

The terms "computing device" and "mobile device" are used interchangeably herein to refer to any one or all of cellular telephones, smartphones, personal or mobile multimedia players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Power management integrated circuits (power managers, power management ICs, or PMICs) are used for managing the power requirements of host systems. A power manager may manage a rail current provided to a system on chip (SoC), including allowing rail current to exceed a rail current threshold, such as up to an extended rail current threshold. The rail current may be provided to a single and/or multiple processors of the SoC so that the processors may operate. A variable current budget for the multiple processors may allocate more current to certain processors requiring higher performance levels as long as a total aggregated power is within the capabilities of the power manager. The rail current above the rail current threshold can be provided to the one or more processors to allow the one or more processors to perform at levels greater than performance levels for the rail current at or below the rail current threshold for a same number of power manager regulators as compared to power managers not allowing rail current to exceed the rail current threshold.

However, rail currents exceeding the rail current threshold can cause inductor thermal buildup that can be detrimental to the performance and integrity of a computing system. The power manager may generate a signal, such as an interrupt, in response to detecting a thermal buildup caused by rail currents exceeding the rail current threshold. For example, the power manager may detect sustained currents exceeding the rail current threshold for a designated period. In some embodiments, the sustained currents exceeding the rail current threshold may be between the rail current threshold and a higher, extended rail current threshold.

Various embodiments include efficient SoC response mechanisms to the signal to achieve extended rail current threshold response specifications while avoiding or reducing detrimental effects of current mitigation on system performance. Current mitigation at a rail level may be managed by current usage mitigation at a single processor and/or at each of a plurality of processors based on various criteria. Implementing current usage mitigation at the one or more processors may enable reducing current at the rail by amounts sufficient to avoid detrimental effects on the performance and integrity of the computing system by thermal buildup while maintaining avoiding or reducing detrimental effects of current mitigation on system performance.

Different SoCs and processors may have different available information for implementing current usage mitigation at the single processor and/or each of the plurality of processors. For example, an SoC and a processor may have no information about the current at the rail level and/or at the processor level, and/or may have any combination of information about the current at the rail level and/or at the processor level. When no information about the current at the rail level and/or at the processor level is available at the processor for implementing current usage mitigation, the processor may implement current usage mitigation by reducing current usage by a predetermined amount. When information about the current at the rail level and/or at the processor level is available at the processor for implementing current usage mitigation, the processor may implement current usage mitigation by reducing current usage based on the available information.

Various embodiments and examples are described with respect to measuring current, comparing current measurements to current thresholds, and mitigating use of current for ease of explanation and clarity. Descriptions in terms of current are not intended to limit the scope of the claims and specification to only current measurements and current mitigation because various embodiments include measuring, comparing measurements to thresholds, and mitigating using current, voltage, power, and/or any combination thereof.

FIG. 1 illustrates a system including a computing device 10 suitable for use with various embodiments. The computing device 10 may include a system-on-chip (SoC) 12 with a processor 14, a memory 16, a memory interface 34, a communication interface 18, a storage memory interface 20, a clock controller 30, and an interconnect 32. The computing device 10 may further include a communication component 22, such as a wired or wireless modem, a storage memory 24, an antenna 26 for establishing a wireless communication link, a power manager 28, and a memory 36. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), neural network processing unit (NPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The computing device 10 may include any number and combination of memories, such as the memory 16 integral to the SoC 12 and the memory 36 separate from the SoC 12. Any of the memories 16, 36 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random access memory (RAM) or main memory, including static RAM (SRAM), such as the memory 16, dynamic RAM (DRAM), such as the memory 36, or cache memory.

The memories 16, 36 may be configured to temporarily store a limited amount of data received from a data sensor or subsystem, data and/or processor-executable code instructions that are requested from a non-volatile memory 16, 24, 36 loaded to the memories 16, 36 from the non-volatile memory 16, 24, 36 in anticipation of future access based on a variety of factors, and/or intermediary processing data and/or processor-executable code instructions produced by the processor 14 and temporarily stored for future quick access without being stored in non-volatile memory 16, 24, 36. The memory 16, 36 may be configured to store data and processor-executable code in parts of the memory 16, 36 configured to store data and processor-executable code for secure computing operations, referred to herein as a secure portion. The memory 16, 36 may be configured to store data and processor-executable code in parts of the memory 16, 36 configured to store data and processor-executable code for non-secure computing operations, referred to herein as a non-secure portion.

The memory interface 34 may work in unison with the memory 36 to enable the computing device 10 to store and retrieve data and processor-executable code on and from the memory 36. The memory interface 34 may control access to the storage memory 36 and allow the processor 14 to read data from and write data to the memory 36.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The power manager 28 may be configured to control power states of one or more power rails (not shown) for power delivery to the components of the SoC 12. In some embodiments, the power manager 28 may be configured to generate notification signals indicating power states and/or power events of the power rails to the components of the SoC 12 to prompt the components of the SoC 12 to respond to the signaled power states and/or events. For example, the notification signals generated and sent by the power manager 28 may be configured as an interrupt signal associated with a power state and/or a power event of the power rails, such as an electrical level of the power rails exceeding an electrical threshold of the power rails (or power rail electrical threshold). A power state and/or a power event of the power rails may include a current, voltage, and/or power of the power rails exceeding a current, voltage, and/or power threshold of the power rails (or power rail current, voltage, and/or power threshold). In some embodiments, the power manager 28 may be configured to control amounts of power provided to the components of the SoC 12. For example, the power manager 28 may be configured to control connections between components of the SoC 12 and the power rails. As another example, the power manager 28 may be configured to control amounts of power on the power rails connected to the components of the SoC 12. The power manager 28 may be configured as a power management integrated circuit (power management ICs or PMIC).

A clock controller 30 may be configured to control clock signals transmitted to the components of the SoC 12. In some embodiments, the clock controller 30 may be configured to signal clock states, such as gated or ungated, to components of the SoC 12 to prompt the components of the SoC 12 to transition to the clock state. For example, a component of the SoC 12 may transition to a gated clock state in response to receiving a gated clock state signal from the clock controller 30 by disconnecting from a clock signal and may transition to an ungated clock state in response to receiving an ungated clock state signal from the clock controller 30 by connecting to the clock signal. In some embodiments, the clock controller 30 may be configured to control clock signals to components of the SoC 12. For example, the clock controller 30 may disconnect a component of the SoC 12 from a clock signal to transition the component of the SoC 12 to a gated clock state and may connect the component of the SoC 12 to the clock signal to transition the component of the SoC 12 to an ungated clock state.

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2A:
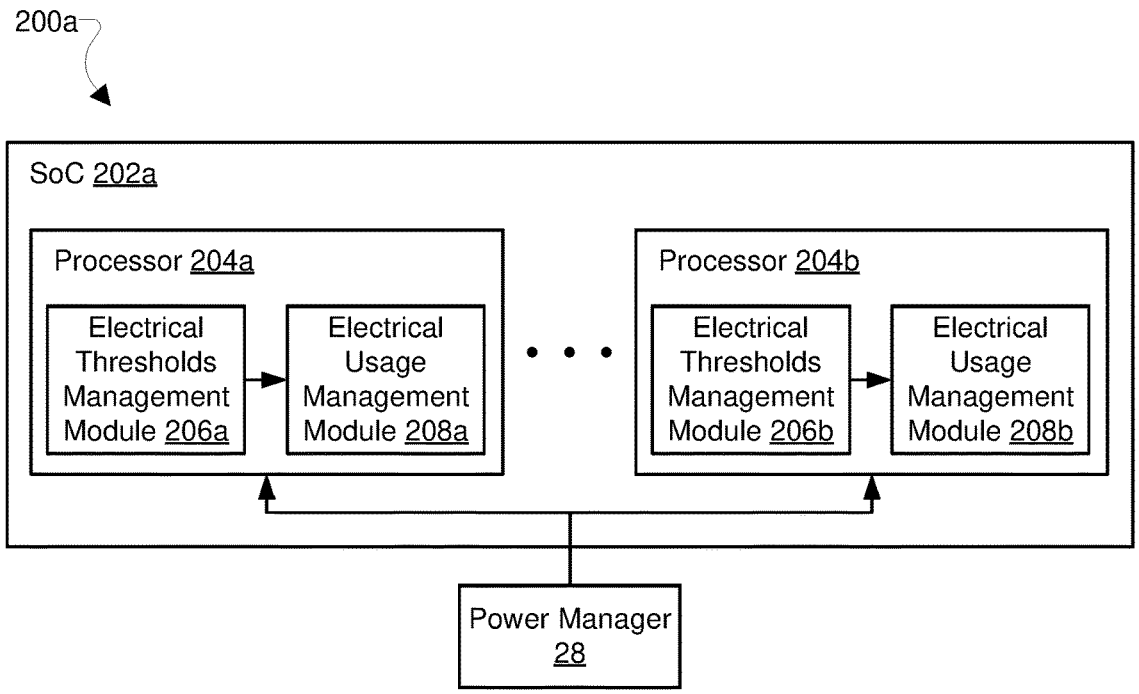
FIGS. 2A-2D are component block diagrams illustrating example power management systems suitable for implementing various embodiments.
Figure 2B:
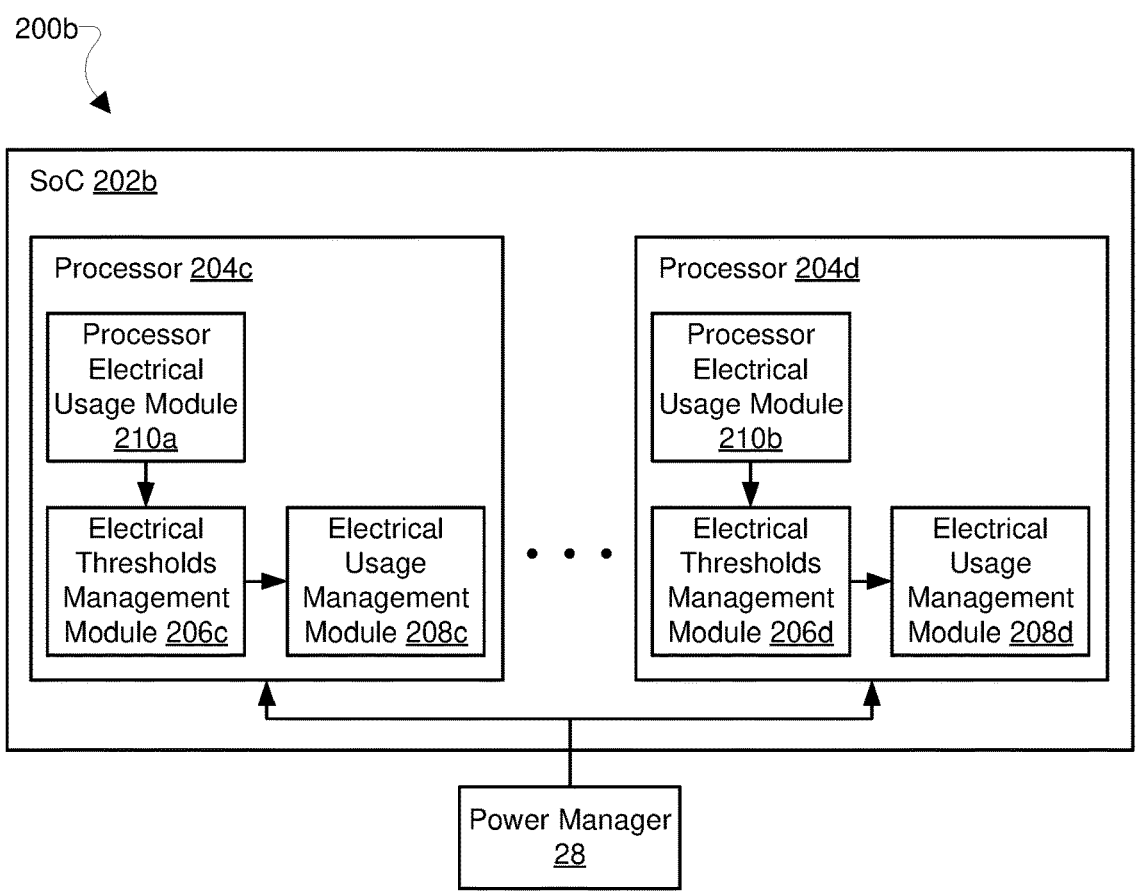
Figure 2C:
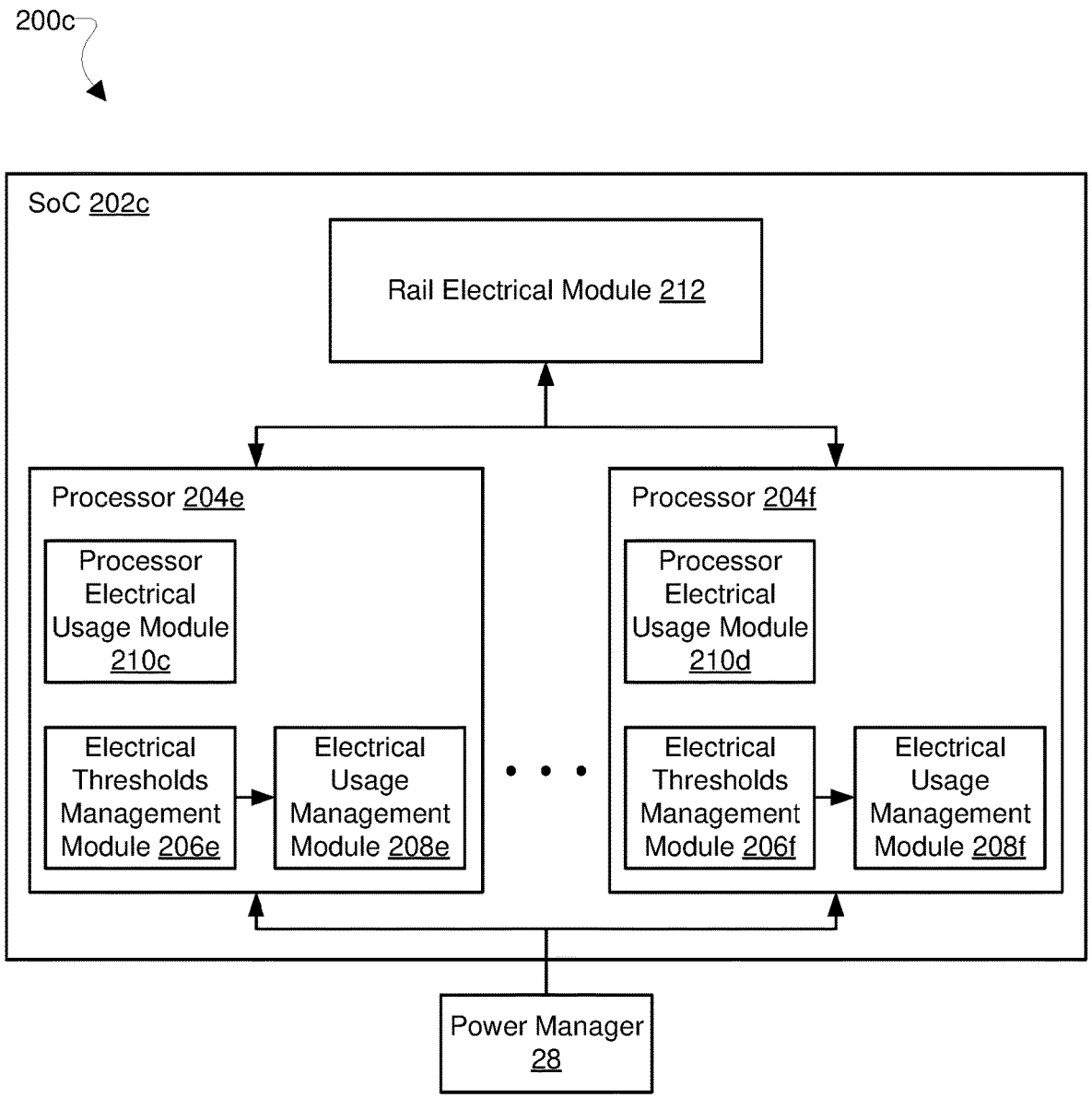
Figure 2D:
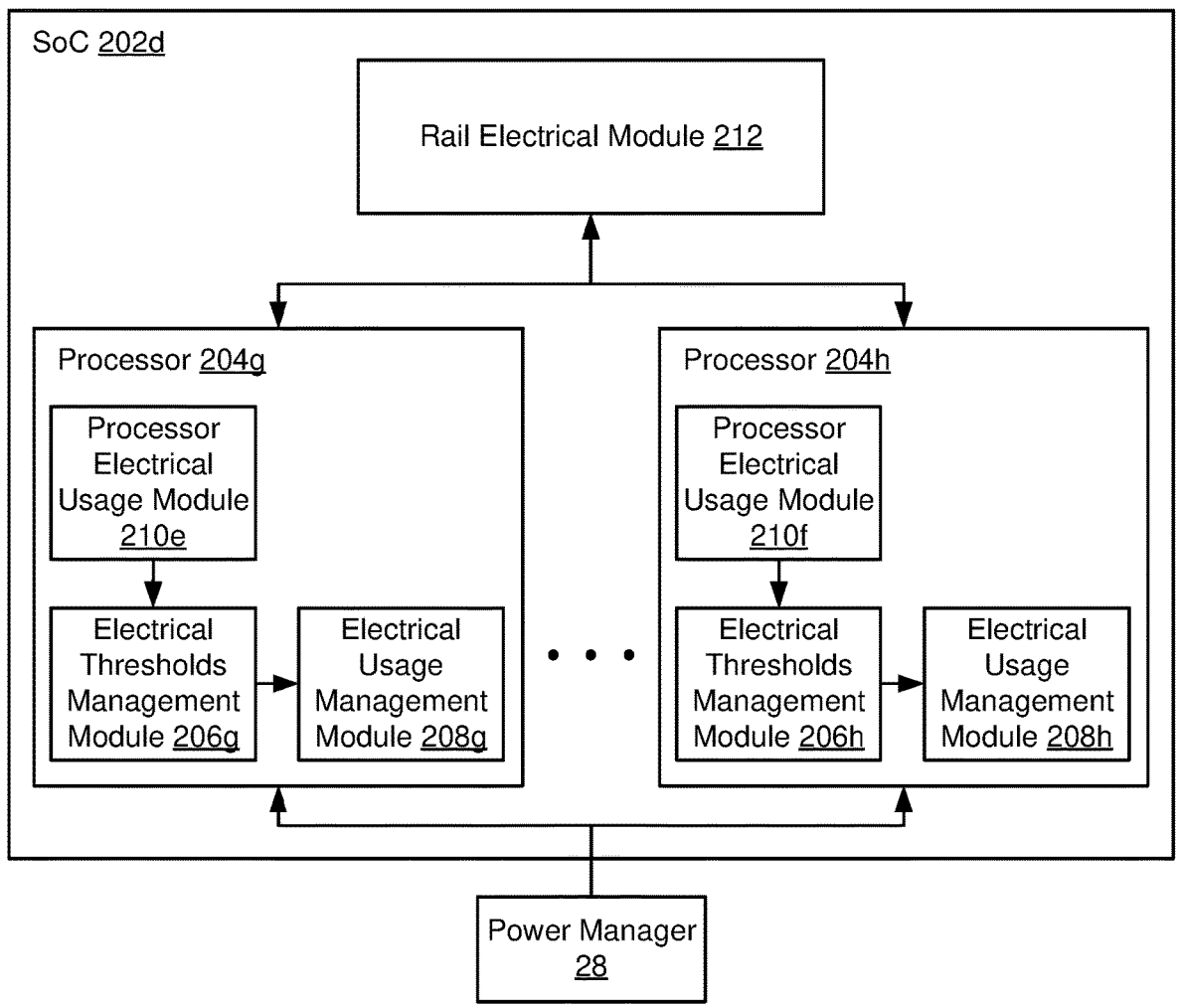

FIGS. 2A-2D illustrate examples of power management systems 200a, 200b, 200c, 200d suitable for implementing various embodiments. With reference to FIGS. 1-2D, the example power management systems 200a-200d may include a power manager 28 electrically connected to an SoC 202a, 202b, 202c, 202d (e.g., SoC 12 in FIG. 1). The SoC 202a-202d may include at least one processor 204a, 204b, 204c, 204d, 204e, 204f, 204g, 204h (e.g., processor 14 in FIG. 1). The processor 204a-204h may include at least an electrical thresholds management module 206a, 206b, 206c, 206d, 206e, 206f, 206g, 206h and an electrical usage management module 208a, 208b, 208c, 208d, 208e, 208f, 208g, 208h. The SoC 202 may include any combination of processors 204a-204h, including of same and/or different configurations and/or capabilities.

Each of the processors 204a-204h may have an associated electrical threshold (or processor electrical threshold) and an extended electrical threshold (or processor extended electrical threshold), which may be the same and/or different from other processors 204a-204h. For example, the electrical threshold may include a current, voltage, and/or power threshold (or processor current, voltage, and/or power threshold) and an extended electrical threshold may include an extended current, voltage, and/or power threshold (or processor extended, voltage, and/or power current threshold). The processor electrical threshold may include an electrical level (e.g., current, voltage, and/or power) for the associated processor 204a-204h at and/or below which the associated processor 204a-204h is designed to operate. The extended electrical threshold may include an electrical level (e.g., current, voltage, and/or power) for the associated processor 204a-204h at and/or above which the associated processor 204a-204h may be triggered to mitigate an electrical level (e.g., current, voltage, and/or power) of the associated processor 204a-204h, irrespective of other factors, such as an electrical level (e.g., current, voltage, and/or power) of a power rail. At and/or between the processor electrical threshold and the extended electrical threshold, the associated processor 204a-204h may be enabled to operate without mitigation of an electrical level unless mitigation of the electrical level is triggered in response to other factors, such as an electrical level of a power rail as described further herein.

The power manager 28 may be configured to control power states of one or more power rails (not shown) for power delivery to the components of the SoC 202a-202d, such as the processors 204a-204h. In some embodiments, the power manager 28 may be configured to control power states of one or more dedicated power rails (not shown) for power delivery to a specific component of the SoC 202a-202d, such as one processor 204a-204h. In some embodiments, the power manager 28 may be configured to control power states of one or more shared power rails (not shown) for power delivery to multiple components of the SoC 202a-202d, such as multiple processors 204a-204h.

The power manager 28 may be configured to generate notification signals indicating power states and/or power events of the power rails to the processors 204a-204h to prompt the processors 204a-204h to respond to the signaled power states and/or events. For example, the notification signals generated and sent by the power manager 28 may be configured as an interrupt signal associated with a power state and/or a power event of the power rails, such as an electrical level of the power rails exceeding a power rail electrical threshold. A power state and/or a power event of the power rails may include a current, voltage, and/or power of the power rails exceeding a power rail current, voltage, and/or power threshold. For example, the power states and/or the power events of the power rails may include the electrical level of the power rails exceeding the power rail electrical threshold and remaining below an extended electrical threshold of the power rails (or power rail extended electrical threshold) for a designated period, where the extended electrical threshold level is greater than the electrical threshold level. The power states and/or the power events of the power rails may include current, voltage, and/or power on the power rails exceeding the power rail current, voltage, and/or power threshold and remaining below an extended current, voltage, and/or power threshold of the power rails (or power rail extended current, voltage, and/or power threshold) for a designated period, where the extended current, voltage, and/or power threshold level is greater than the current, voltage, and/or power threshold level. In some embodiments, the power manager 28 may be configured to generate notification signals indicating power states and/or power events of the dedicated power rails to the processor 204a-204h to prompt the processor 204a-204h to respond to the signaled power states and/or events. In some embodiments, the power manager 28 may be configured to generate notification signals indicating power states and/or power events of the shared power rails to the processors 204a-204h to prompt the processors 204a-204h to respond to the signaled power states and/or events.

In embodiments with dedicated power rails, the electrical thresholds management module 206a-206h of the processor 204a-204h may receive a notification signal from the power manager 28 and determine whether to mitigate electrical usage of the processors 204a-204h. Mitigating electrical usage of the processors 204a-204h may include mitigating current, voltage, and or power of the processors 204a-204h. In embodiments with shared power rails, the electrical thresholds management modules 206a-206h of the processors 204a-204h may each receive a notification signal from the power manager 28 and determine whether to mitigate electrical usage of the processors 204a-204h. How each of the electrical thresholds management modules 206a-206h determines whether to mitigate electrical usage of a respective processor 204a-204h may vary based, for example, on availability of information, including electrical level estimates and/or measurements of the power rails and/or one or more of the processors 204a-204h. Electrical level estimates and/or measurements of the power rails and/or one or more of the processors 204a-204h may include current, voltage, and/or power estimates and/or measurements of the power rails and/or one or more of the processors 204a-204h. In FIG. 2A, each of the electrical thresholds management modules 206a, 206b may determine whether to mitigate electrical usage of the respective processor 204a, 204b based on receiving the notification signal from the power manager 28.

As illustrated in FIG. 2B, the processors 204c, 204d may include processor electrical usage modules 210a, 210b.

In embodiments with dedicated power rails, the processor electrical usage module 210a, 210b of the processor 204c, 204d may generate and send processor electrical usage signals indicating electrical usage of the processor 204c, 240d to the electrical thresholds management module 206c, 206d. Processor electrical usage signals may include processor current, voltage, and/or power signals indicating current, voltage, and/or power usage of the processor 204c, 240d. The electrical thresholds management module 206c, 206d may determine whether to mitigate electrical usage of the respective processor 204c, 204d based on receiving the notification signal from the power manager 28 and the processor electrical usage signals from the processor electrical usage module 210a, 210b.

In embodiments with shared power rails, the processor electrical usage modules 210a, 210b of the processors 204c, 204d may generate and send processor electrical usage signals indicating electrical usage of the processors 204c, 240d to the electrical thresholds management modules 206c, 206d. Processor electrical usage signals may include processor current, voltage, and/or power usage signals indicating current, voltage, and/or power usage of the processors 204c, 240d. The electrical thresholds management modules 206c, 206d may determine whether to mitigate electrical usage of the processors 204c, 204d based on receiving the notification signal from the power manager 28 and the processor electrical usage signals from the processor electrical usage modules 210a, 210b.

As illustrated in FIG. 2C, the processors 204e, 204f may include processor electrical usage modules 210c, 210d and a power rail electrical module 212.

In embodiments with dedicated power rails, the processor electrical usage module 210c, 210d may send processor electrical usage signals indicating electrical usage of the processor 204c, 240d to the power rail current module 212. Processor electrical usage signals may include processor current, voltage, and/or power signals indicating current, voltage, and/or power usage of the processor 204c, 240d. In response, the power rail electrical module 212 may generate power rail electrical signals indicating electricity levels of the dedicated power rails based on the processor electrical usage signals for the processor 204c, 204d. Power rail electrical signals may include power rail current, voltage, and/or power signals indicating current, voltage, and/or power of the dedicated power rails based on the processor current, voltage, and/or power usage signals for the processor 204c, 204d. The power rail electrical module 212 may send the power rail electrical signals to the electrical thresholds management module 206c, 206d. The electrical thresholds management module 206c, 206d may determine whether to mitigate electrical usage of the processor 204c, 204d based on receiving the notification signal from the power manager 28 and the power rail electrical signals from the power rail electrical module 212.

In embodiments with shared power rails, the processor electrical usage modules 210c, 210d may send processor electrical usage signals indicating electrical usage of the processors 204c, 240d to the power rail electrical module 212. Processor electrical usage signals may include processor current, voltage, and/or power signals indicating current, voltage, and/or power usage of the processor 204c, 240d. In response, the power rail electrical module 212 may generate power rail electrical signals indicating electricity levels of the power rails based on an accumulation of the processor electrical usage signals for the processors 204c, 204d. Power rail electrical signals may include power rail current, voltage, and/or power signals indicating current, voltage, and/or power of the power rails based on an accumulation of the processor current, voltage, and/or power usage signals for the processor 204c, 204d. The power rail current module 212 may send the power rail electrical signals to the electrical thresholds management modules 206c, 206d. The electrical thresholds management modules 206c, 206d may determine whether to mitigate electrical usage of the processors 204c, 204d based on receiving the notification signal from the power manager 28 and the power rail electrical signals from the power rail electrical module 212.

As illustrated in FIG. 2D, the processors 204g, 204h may include processor electrical usage modules 210e, 210f and the power rail electrical module 212.

In some embodiments with dedicated power rails, the processor electrical usage module 210e, 210f may send processor electrical usage signals indicating electrical usage of the processor 204e, 240f to the electrical thresholds management module 206e, 206f. Processor electrical usage signals may include processor current, voltage, and/or power signals indicating current, voltage, and/or power usage of the processor 204e, 240f. The electrical thresholds management module 206e, 206f may determine whether to mitigate electrical usage of the processor 204e, 204f based on receiving the notification signal from the power manager 28 and/or the processor electrical usage signals from the processor electrical usage module 210e, 210f.

In some embodiments with dedicated power rails, the processor electrical usage module 210e, 210f may send processor electrical usage signals indicating electrical usage of the processor 204e, 240f to the electrical thresholds management module 206e, 206f and to the power rail electrical module 212. Processor electrical usage signals may include processor current, voltage, and/or power signals indicating current, voltage, and/or power usage of the processor 204e, 240f. The power rail electrical module 212 may generate and send power rail electrical signals indicating electricity levels of the dedicated power rails based on the processor electrical usage signals for the processor 204e, 204f to the electrical thresholds management module 206e, 206f. Power rail electrical signals may include power rail current, voltage, and/or power signals indicating current, voltage, and/or power of the dedicated power rails based on the processor current, voltage, and/or power usage signals for the processor 204e, 204f. The electrical thresholds management module 206e, 206f may determine whether to mitigate electrical usage of the processor 204e, 204f based on receiving the notification signal from the power manager 28, the power rail electrical signals from the power rail current module 212, and/or the processor electrical usage signals from the processor electrical usage module 210e, 210f.

In embodiments, with shared power rails, the processor electrical usage modules 210e, 210f may send processor electrical usage signals indicating electrical usage of the processors 204e, 240f to the electrical thresholds management module 206e, 206f and to the power rail electrical module 212. Processor electrical usage signals may include processor current, voltage, and/or power signals indicating current, voltage, and/or power usage of the processors 204e, 240f. The power rail electrical module 212 may generate and send power rail electrical signals indicating electricity levels of the power rails based on an accumulation of the processor electrical usage signals for the processors 204e, 204f to the electrical thresholds management modules 206e, 206f. Power rail electrical signals may include power rail current, voltage, and/or power signals of the power rails based on an accumulation of the processor current, voltage, and/or power usage signals for the processors 204e, 204f. The electrical thresholds management modules 206e, 206f may determine whether to mitigate electrical usage of the processors 204e, 204f based on receiving the notification signal from the power manager 28, the power rail electrical signals from the power rail electrical module 212, and/or the processor electrical usage signals from the processor electrical usage modules 210e, 210f.

Referring again to FIGS. 2A-2D, in response to determining to mitigate electrical usage, each of the electrical thresholds management modules 206a-206h generates electrical usage mitigation parameters for implementing electrical usage mitigation, such as a representation of an electrical usage reduction amount by which to reduce electrical usages by the respective processor 204a-204h. Electrical usage mitigation parameters may include current, voltage, and or power mitigation parameters, such as a representation of a current, voltage, and/or power reduction amount by which to reduce current, voltage, and/or power usages by the respective processor 204a-204h. Electrical usage mitigation may include current, voltage, and/or power usage mitigation. The electrical usage mitigation parameters may be sufficient to reduce and/or maintain electrical levels of the dedicated and/or shared power rails below power rail electrical thresholds for a designated period. Electrical levels of the dedicated and/or shared power rails may include current, voltage, and/or power levels of the dedicated and/or shared power rails. How each of the electrical thresholds management modules 206a-206h generates electrical usage mitigation parameters may vary based on availability of information including, for example, electrical level estimates and/or measurements of the dedicated and/or shared power rails and/or one or more of the processors 204a-204h. Electrical level estimates and/or measurements may include current, voltage, and/or power estimates and/or measurements of the dedicated and/or shared power rails and/or one or more of the processors 204a-204h.

In FIG. 2A, the notification signals from the power manager 28 may be available to the electrical thresholds management module 206a, 206b, which may generate the electrical usage mitigation parameters using a predefined electrical level amount by which to reduce and/or maintain electrical usage of the respective processor 204a, 204b such as a constant amount and/or a proportional amount. The predefined electrical level amount may include a predefined amount of current, voltage, and/or power by which to reduce and/or maintain current, voltage, and/or power usage of the respective processor 204a, 204b.

As illustrated in FIG. 2B, the processor electrical usage signals from the processor electrical usage module 210a, 210b may be available to the electrical thresholds management module 206c, 206d. The electrical thresholds management module 206c, 206d may generate the electrical usage mitigation parameters using an electrical level amount sufficient to reduce and/or maintain electrical usage of the respective processor 204c, 204d below the respective processor electrical threshold. The electrical level amount may include an amount of current, voltage, and/or power sufficient to reduce and/or maintain current, voltage, and/or power usage of the respective processor 204c, 204d below the respective processor current, voltage, and/or power threshold. Such an electrical level amount sufficient to reduce and/or maintain electrical usage of the respective processor 204c, 204d below the respective processor electrical threshold may be a difference between the electrical usage of the processor 204c, 204d and the respective processor electrical threshold. For example, the electrical level amount may be a difference between the current, voltage, and/or power of the processor 204c, 204d and the respective processor current, voltage, and/or power threshold.

As illustrated in FIG. 2C, the power rail electrical signals from the power rail electrical module 212 may be available to the electrical thresholds management module 206e, 206f.

In embodiments with dedicated power rails, the electrical thresholds management module 206e, 206f may generate the electrical usage mitigation parameters using an electrical level amount proportional to an electrical level amount by which the electricity level on the dedicated power rails exceeds the power rail electrical threshold. The electrical level amount may be an amount of current, voltage and/or power proportional to an amount of current, voltage and/or power by which the of current, voltage and/or power on the dedicated power rails exceeds the power rail of current, voltage and/or power threshold In embodiments with shared power rails, the electrical thresholds management module 206e, 206f may generate the electrical usage mitigation parameters using an electrical level amount proportional to an electrical level amount by which the electricity level on the shared power rails exceeds the power rail electrical threshold. The electrical level amount may be an amount of current, voltage and/or power proportional to an amount of current, voltage and/or power by which the current, voltage and/or power on the shared power rails exceeds the power rail current, voltage and/or power threshold.

As illustrated in FIG. 2D, the processor electrical usage signals from the processor electrical usage module 210e, 210f and the power rail electrical signals from the power rail electrical module 212 may be available to the electrical thresholds management module 206g, 206h.

In embodiments with dedicated power rails, the electrical thresholds management module 206g, 206h may generate the electrical usage mitigation parameters using an electrical level amount sufficient to reduce and/or maintain electrical usage of the processor 204g, 204h below the respective processor electrical threshold and/or an electrical level amount proportional to an electrical level amount by which the electricity level on the dedicated power rails exceeds the power rail electrical threshold. The electrical level amount may be an amount of current, voltage and/or power sufficient to reduce and/or maintain current, voltage and/or power usage of the processor 204g, 204h below the respective processor current, voltage and/or power threshold and/or an amount of current, voltage and/or power proportional to an amount of current, voltage and/or power by which the current, voltage and/or power on the dedicated power rails exceeds the power rail current, voltage and/or power threshold. For example, the current thresholds management modules 206g, 206h may generate the current usage mitigation parameters using a lesser of these amounts.

In embodiments having shared power rails, the electrical thresholds management module 206g, 206h may generate the electrical usage mitigation parameters using an electrical level amount sufficient to reduce and/or maintain electrical usage of the processor 204g, 204h below the respective processor electrical threshold and/or an electrical level amount proportional to an electrical level amount by which the electricity levels on the power rails exceeds the shared power rail electrical threshold. An electrical level amount may be an amount of current, voltage, and/or power sufficient to reduce and/or maintain current, voltage, and/or power usage of the processor 204g, 204h below the respective processor current, voltage, and/or power threshold and/or an amount of current, voltage, and/or power proportional to an amount of current, voltage, and/or power by which the current, voltage, and/or power on the power rails exceeds the shared power rail current, voltage, and/or power threshold. For example, the electrical thresholds management modules 206g, 206h may generate the electrical usage mitigation parameters using a lesser of these amounts.

Referring again to FIGS. 2A-2D, the electrical usage of the processor 204a-204h may be a peak electrical usage for a process, voltage, temperature, and/or use case of the processors 204a-204h. Electrical usage of the processor 204a-204h may include current, voltage, and/or power usage of the processor 204a-204h. Electrical usage of the processor 204a-204h may be measured and/or calculated in real-time during operation of the processor 204a-204h. The electrical usage of the processor 204a-204h may be retrieved from memory (e.g., memory 16, 36 in FIG. 1), such as from a stored lookup table and/or calculated. In some examples, a process indicator may be retrieved from a fused value, a voltage may be received from a voltage manager (not shown), a temperature may be received from a temperature monitor (not shown), and/or a use case may be received from an executing software. If any of the variables for determining the electrical usage of the processor 204a-204h is unavailable, the determination may be made using a worst-case scenario for the unavailable variable.

The electrical thresholds management module 206a-206h may calculate an electrical usage reduction for the processor 204a-204h. The electrical usage reduction for the processor 204a-204h may be calculated based on a difference between an electrical usage of the power rail and the power rail electrical threshold. The electrical usage of the power rail may be the peak electrical usage of one or more processors 204a-204h coupled to the power rail. For example, the electrical usage reduction for the processor 204a-204h may be calculated based on a difference between the peak current, the peak voltage, and/or the peak power usage for a process, voltage, temperature, and/or use case of the power rail based on the peak electrical usage of one or more processors 204a-204h and the rail current, voltage, and/or power threshold. The electrical usage reduction for the processor 204a-204h may be calculated based on a difference between the electrical usage of the processor 204a-204h and the processor electrical threshold for the processor 204a-204h. For example, the electrical usage reduction for the processor 204a-204h may be calculated based on a difference between the current, voltage, and/or power of the processor 204a-204h and the processor current, voltage, and/or power threshold for the processor 204a-204h. In some examples, the electrical usage reduction for the processor 204a-204h may be based on a lower value of the difference between the peak electrical usage for a process, voltage, temperature, and/or use case of the power rail and the power rail electrical threshold, the difference between the electrical usage of the processor 204a-204h and the processor electrical threshold for the processor 204a-204h, and/or a constant value, such as zero ("0").

The electrical thresholds management module 206a-206h may generate and send electrical usage mitigation signals to trigger electrical usage mitigation. The electrical usage mitigation signals may include the electrical usage mitigation parameters for implementing electrical usage mitigation, such as to achieve the electrical usage reduction. The electrical usage mitigation parameters may include an indication of the electrical usage reduction and/or values for controlling components of the SoC 202a-202d, such as a clock and/or an instruction scheduler, for achieving the electrical usage reduction. For example, the indication of the electrical usage reduction may include an amount by which to reduce current, voltage, and/or power for the processor 204a-204h. For example, values for controlling components of the SoC 202a-202d may include a clock frequency reduction value configured to indicate an amount by which to reduce a frequency of the processor 204a-204h and/or an instruction density reduction value configured to indicate an amount by which to reduce an instruction density for the processor 204a-204h.

In response to receiving the electrical usage mitigation signals from the electrical thresholds management module 206a-206h, the electrical usage management module 208a-208h may implement electrical usage mitigation. For example, the electrical usage management module 208a-208h may be a clock controller that may reduce frequency of the processor 204a-204h by an amount based on the electrical usage mitigation parameters. Such an amount to reduce frequency of the processor 204a-204h may be a current of the electrical usage mitigation parameters divided by capacitance per voltage squared. As another example, the electrical usage management module 208a-208h may be an instruction scheduler that may reduce instruction density of the processors 204a-204h by an amount based on the electrical usage mitigation parameters. Such an amount to reduce instruction density may be a predefined limit of a number of high power density instructions associated with the electrical usage mitigation parameters.

Figure 3:
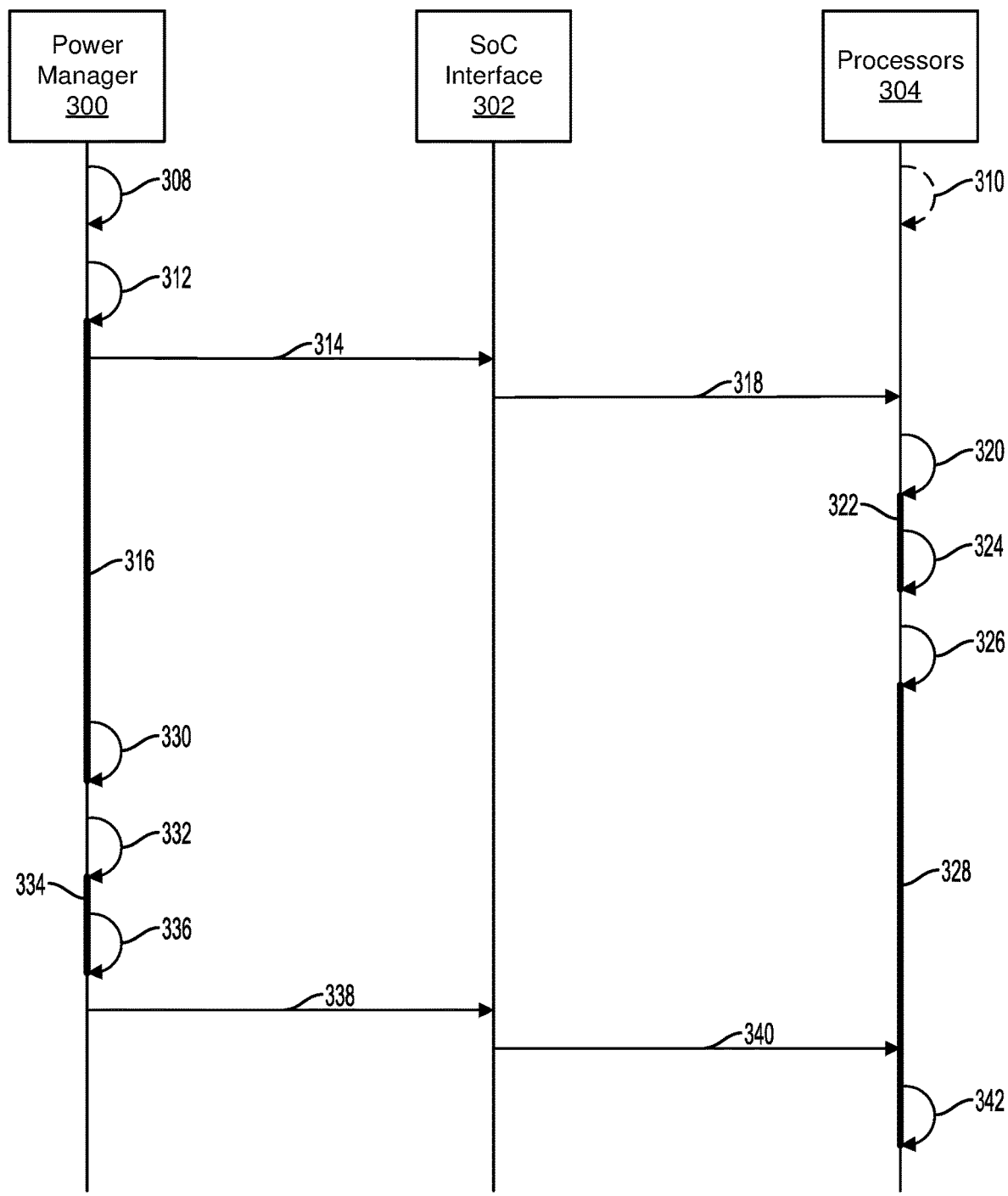
FIG. 3 is a component block and signaling flow diagram illustrating an example of extended electrical threshold management for implementing various embodiments.

FIG. 3 illustrates example components and signals of extended electrical threshold management in a power management system (e.g., power management system 200a-200d in FIGS. 2A-2D) for implementing various embodiments. With reference to FIGS. 1-3, the power management system may include a power manager 300 (e.g., power manager 28 in FIGS. 1 and 2), an SoC 302 (e.g., SoC 12, 202a-202d in FIGS. 1-2D), and at least one processor 304 (e.g., processor 14, 204a-204h in FIGS. 1-2D). The embodiments and examples described with reference to FIG. 3 refer to the example of measuring and limiting current for ease of explanation and clarity. However, descriptions in terms of current are not intended to limit the scope of the claims and specification because the embodiments may be implemented in terms of current, voltage, power, and/or any combination thereof.

The power manager 300 may implement a process for detecting whether current, voltage, and/or power of one or more power rails (not shown) exceed the power rail current, voltage, and/or power threshold (operation 308). For example, the power manager may check for currents, voltages, and/or power persistently exceeding the power rail current, voltage, and/or power threshold, but not exceeding the power rail extended current, voltage, and/or power threshold, during a qualification period. In response to detecting that the current, voltage, and/or power of one or more power rails exceed the power rail current, voltage, and/or power threshold, the power manager 300 may start a power rail extended current period 316 (operation 312). The power rail extended current period 316 may be a duration in which the current, voltage, and/or power of the one or more power rails may exceed the power rail current, voltage, and/or power threshold and the processors 304 may start a process for mitigating current use as described further herein. The power manager 300 may generate and send a notification signal configured to indicate that the current, voltage, and/or power of one or more power rails exceed the power rail current, voltage, and/or power threshold (operation 314). The SoC 302 may receive the notification signal sent by the power manager 300 (operation 314) and send the notification signal to each of the one or more processors 304 (operation 318). In embodiments with one or more dedicated power rails, the SoC 304 may send the notification signal to one processor 304. In embodiments with one or more shared power rails, the SoC 304 may send the notification signal to at least two processors 304.

The processor 304 may repeatedly and/or continuously implement a process for detecting whether current of one or more power rails exceeds the power rail current threshold and/or current of the respective processor 304 exceeds the respective extended processor current threshold (operation 310). In some examples, the current of the respective processors 304 may be a peak current for a process, voltage, temperature, and/or use case of the respective processors 304. In some examples, the current of the one or more power rails may be a peak current for the one or more power rails for a process, voltage, temperature, and/or use case of the one or more power rails based on the peak current of one or more processors 304. Receiving the notification signal sent by SoC 302 (operation 318) may trigger the processor 304 to start a processor extended current period 322 (operation 320). The processor extended current period 322 may be a duration in which the current of the respective processor 304 may exceed the respective extended processor current threshold and the respective processor 304 may start a process for mitigating current use as described further herein. In examples where the processor 304 optionally detects whether current of the respective processor 304 exceeds the respective extended processor current threshold (operation 310), receiving the notification signal sent by SoC 302 (operation 318) while detecting that the current of the respective processor 304 exceeds the respective processor extended current threshold (operation 310), the processor 304 may start the processor extended current period 322 (operation 320).

The processor 304 that starts the processor extended current period 322 may implement a process for mitigating current use by the respective processor 304 (operation 324). The aim and result of the current usage mitigation process may be to reduce and/or maintain the power rail current of the one or more power rails below the power rail current threshold. In implementing the process for mitigating current use, the processor 304 may determine whether the current use of the respective processor 304 exceeds the processor current threshold. In response to determining that the current use of the respective processor 304 does exceed the processor current use threshold, the respective processor 304 may mitigate current use of the respective processor to reduce and/or maintain current use below the processor current threshold. The respective processor 304 may start a processor current usage mitigation period 328 (operation 326), during which the respective processor 304 may initialize implementation the current usage mitigation process.

The power manager 300 may end the power rail extended current period 316 (operation 330) once the power rail extended current period 316 elapses. The power manager 300 may detect when the power rail current of the one or more power rails is below the power rail current threshold and start a cool off period 334 (operation 332). The power manager 300 may detect whether the power rail current of the one or more power rails remains below the power rail current threshold and may end the cool off period 334 in response to detecting the power rail current of the one or more power rails remains below the power rail current threshold. For example, the power manager 300 may detect whether the power rail current of the one or more power rails remains below the power rail current threshold during the qualification period. Following the end of the cool off period 334, the power manager 300 may generate and send a notification signal configured to indicate that the power rail current of the one or more power rails no longer exceed the power rail current threshold (operation 338). The SoC 302 may receive the notification signal sent by the power manager 300 (operation 338) and send the notification signal to each of the one or more processors 304 (operation 340). In embodiments with one or more dedicated power rails, the SoC 304 may send the notification signal to the one processor 304. In embodiments with one or more shared power rails, the SoC 304 may send the notification signal to the at least two processors 304.

Receiving the notification signal sent by SoC 302 (operation 318) may trigger the processor 304 mitigating the current use of the respective processor 304 to end the processor current usage mitigation period 328 and end implementing the current usage mitigation process (operation 342).

Figure 4:
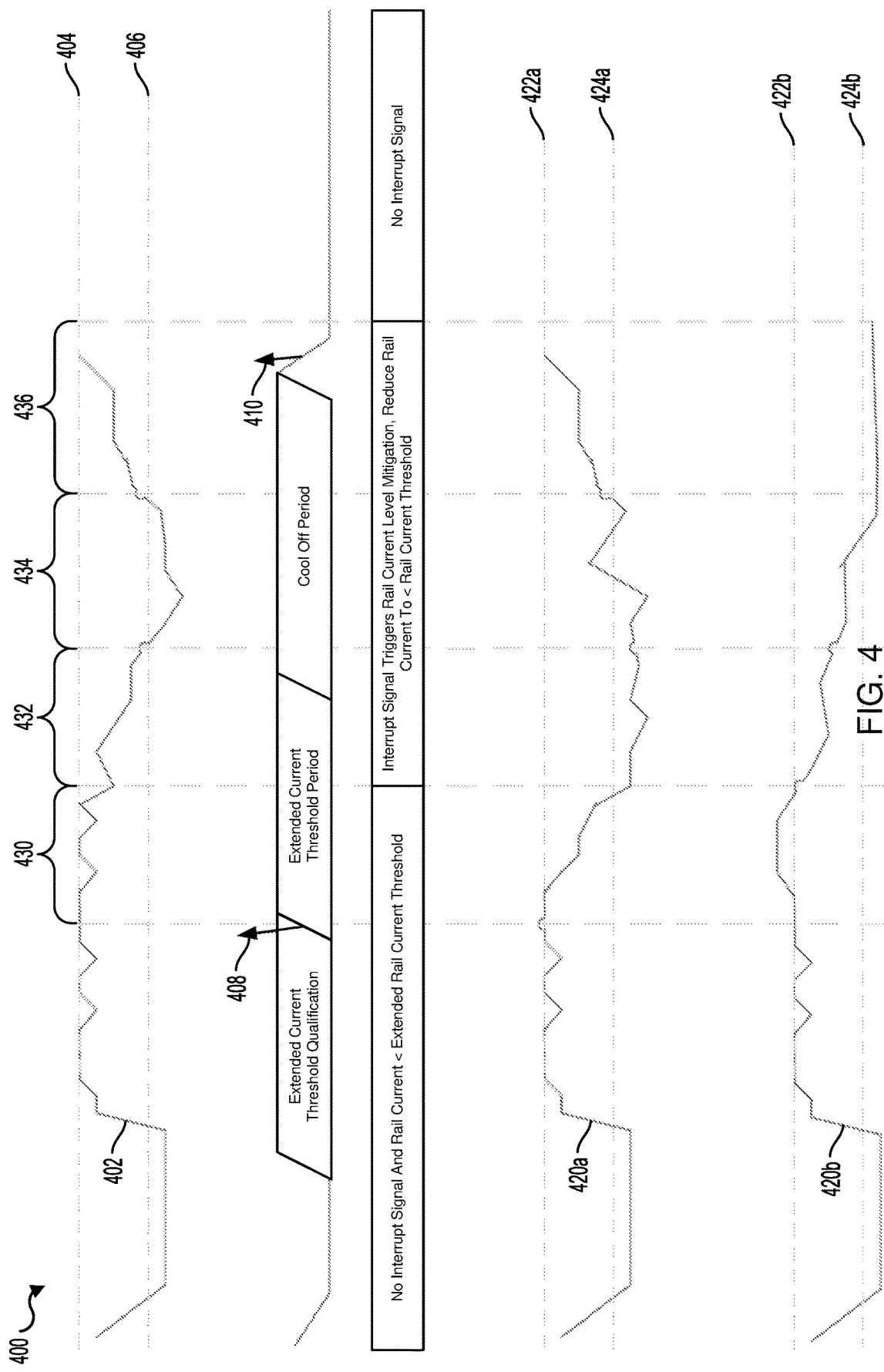
FIG. 4 is a graph diagram illustrating an example of extended electrical threshold management for implementing various embodiments.

FIG. 4 illustrates a set of graphs representing an example of extended current threshold management for implementing various embodiments. With reference to FIGS. 1-4, the set of graphs 400 may be for a power management system (e.g., power management system 200*a*-200*d* in FIGS. 2A-2D) charting current 402 for one or more power rails and current 420*a*, 420*b* for multiple processors (e.g., processor 14, 204*a*-204*h*, 304 in FIGS. 1-3). The embodiments and examples described with reference to FIG. 4 refer to the example of measuring and limiting current for ease of explanation and clarity. However, descriptions in terms of current are not intended to limit the scope of the claims and specification because the embodiments may be implemented in terms of current, voltage, power, and/or any combination thereof.

The example in FIG. 4 is for illustrative purposes and does not represent the entirety of potential circumstances and responses for the current 402 for one or more power rails and current 420*a*, 420*b* for multiple processors, and does not limit the scope of the claims and specification to this example. Other descriptions of circumstances and responses for current for one or more power rails 402 and current for multiple processors may be similarly charted. Nor do the does the number of currents graphed for components, such as the two currents for two processors, limit the scope of the claims and specification to this example. Other combinations of components, such as more than two processors, may be similarly charted.

The current 402 for one or more power rails may be associated with thresholds, including a power rail current threshold 406 and a power rail extended current threshold 404, which may be greater than the power rail current threshold 406. Throughout the example illustrated in FIG. 4, the current 402 for one or more power rails may, at times, exceed and fall below the power rail current threshold 406, and may not exceed the power rail extended current threshold 404. The current 402 for one or more power rails may remain above the power rail current threshold 406 while a power manager (e.g., power manager 28, 300 in FIGS. 1-3) detects whether the current 402 persistently exceeds the power rail current threshold 406 during a power rail current extended threshold qualification period. In response to detecting that the current 402 for one or more power rails exceed the power rail current threshold 406, the power manager may generate and send a notification signal 408 configured to indicate that the current of one or more power rails exceed the power rail current threshold 406. The power manager may implement successive periods, such as a power rail extended current period and a cool off period. During these consecutive periods, triggered by the notification signal 408, the processors may affect the current 402 of one or more power rails by mitigating current use of the processors. The current 402 for one or more power rails may be the peak electrical current for a process, voltage, temperature, and/or use case of the one or more power rails based on the peak currents of the multiple processors.

The current 420a, 420b for the processors may be associated with thresholds, including processor current thresholds 424a, 424b and processor extended current thresholds 422a, 422b, which may be greater than the respective processor current thresholds 424a, 424b. The processor response to the notification signal 408 may be controlled by a few factors: the notification signal 408, the current 402 for one or more power rails in relation to the power rail current threshold 406 and the power rail extended current threshold 404, and the current 420a, 420b for the processors in relation to the respective processor current thresholds 424a, 424b and processor extended current thresholds 422a, 422b.

Generally, when there is no notification signal 408 but the current 402 for one or more power rails exceeds the power rail extended current threshold 404 and the current 420a, 420b for a respective processor exceeds the respective processor extended current threshold 422a, 422b, the processor may mitigate current usage for the respective processor. For example, the processor may reduce current usage based on a minimum of a difference between the current 420a, 420b for the respective processor and the respective processor extended current threshold 422a, 422b, a difference between the current 402 for one or more power rails and the power rail extended current threshold 404, and a zero ("0") value.

When there is a notification signal 408 and the current 402 for one or more power rails exceeds the power rail current threshold 406 and the current 420a, 420b for the respective processor exceeds the respective processor current threshold 424a, 424b, the processor may mitigate current usage for the respective processor. For example, the processor may reduce current usage based on a minimum of a difference between the current 420a, 420b for the respective processor and the respective processor current threshold 424a, 424b, a difference between the current 402 for one or more power rails and the power rail current threshold 406, and a zero ("0") value.

The power rail extended current period may be a period during which the processors may implement current usage mitigation if needed. A portion of the power manager's power rail extended current period may be a communication period 430 during which the notification signal 408 may be transmitted and processed prior to the processors implementing any current usage mitigation. For the purpose of illustration, the periods 432, 434, 436 are defined by example conditions and do not limit the scope of the claims or specification to these examples. Periods 432, 434, 436 may occur within periods during which current usage mitigation may be implemented, including the extended current period and a cool off period, until the end of the cool off period when the power manager may generate and send a notification signal 410 configured to indicate that the current 402 of one or more power rails no longer exceeds the power rail current threshold 406.

Period 432 is defined by the current 402 for one or more power rails between the power rail current threshold 406 and the power rail extended current threshold 404. In period 432, the current 420a for a processor is less than the processor current threshold 424a and no current usage mitigation is implemented for the processor. The current 420b is greater than the processor current threshold 424b and current usage mitigation for the processor may be implemented.

Period 434 is defined by the current 402 for one or more power rails is less than the power rail current threshold 406 and no current usage mitigation is needed for the currents 420a, 420b for the processors, regardless of whether the currents 420a, 420b exceed the processor current thresholds 424a, 424b.

Period 436 is defined by the current 402 for one or more power rails between the power rail current threshold 406 and the power rail extended current threshold 404. In period 436, the current 420a is greater than the processor current threshold 424a and current usage mitigation for the processor may be implemented. The current 420b for a processor is less than the processor current threshold 424b and no current usage mitigation is implemented for the processor.

FIG. 5 illustrates an example current usage mitigation table of extended current threshold management for implementing various embodiments. With reference to FIGS. 1-5, the current usage mitigation table illustrates that a processor response for current usage mitigation may be based on at least an extended current condition. In some examples, the current usage mitigation table illustrates that a processor response for current usage mitigation may be based on a combination of at least an extended current condition and one or more of a power rail current and/or processor current measurement availability and/or condition. The power rail current may be the peak electrical current for a process, voltage, temperature, and/or use case of the power rail based on peak currents of one or more one or more processors (e.g., processor 14, 204a-204h, 304 in FIGS. 1-3) coupled to one or more power rails. The embodiments and examples described with reference to FIG. 5 refer to the example of measuring and limiting current for ease of explanation and clarity. However, descriptions in terms of current are not intended to limit the scope of the claims and specification because the embodiments may be implemented in terms of current, voltage, power, and/or any combination thereof.

The Extended Current Condition column may include whether one or more processors receive a notification signal indicating a power state and/or power event of power rails to the one or more processors to prompt the one or more processors to respond to the signaled power state and/or event. For example, the notification signals generated and sent by a power manager (e.g., power manager 28, 300 in FIGS. 1-3) may be configured as an interrupt signal associated with a power state and/or a power event of the power rails, such as a power state and/or a power event associated with current exceeding a power rail current threshold.

The Power Rail Current—Available column may include whether a measurement and/or calculation, such as an estimation, of current of one or more power rails is available to the one or more processors. The availability of the current of one or more power rails may depend on a power management system (e.g., power management system 200a-200d, 300 in FIGS. 2A-3) including processor electrical usage modules (e.g., processor electrical usage modules 210a-210f in FIGS. 2B-2D) and/or a power rail electrical module (e.g., power rail current electrical 212 in FIGS. 2C and 2D). The Power Rail Current—Condition column may include how the current of one or more power rails compares to a power rail current threshold and/or an extended power rail current threshold. Cells of the Power Rail Current—Condition column may be blank when the information may have no bearing on whether current usage mitigation may be implemented the one or more processors given the information of the other columns in a same row.

The Processor Current—Available column may include whether a measurement and/or calculation, such as an estimation, of current of the one or more processors is available to the respective one or more processors. The availability of the current of the one or more processors may depend on the power management system including the processor electrical usage modules.

The Processor Current—Condition column may include how the current of the one or more processors compares to a processor current threshold and/or an extended processor current threshold. Cells of the Processor Current-Condition column may be blank when the information may have no bearing on whether current usage mitigation may be implemented the one or more processors given the information of the other columns in a same row.

The Processor Response column may include a description of current usage mitigation that the one or more processors may implement, if any, based on the information of the other columns in a same row. For example, no current usage mitigation may be implemented by a processor when there is no notification signal and the power rail current is less than the extended power rail current threshold, regardless of whether the processor current is available and how the processor current compares to the processor current threshold and extended processor current threshold. Similarly, no current usage mitigation may be implemented by a processor when there is no notification signal and the processor current is less than the extended processor current threshold, regardless of whether the power rail current is available and how the power rail current compares to the power rail current threshold and extended power rail current threshold.

A processor may implement current usage mitigation by capping the processor's maximum frequency for an operation, based on estimated or measured frequencies for the operation, when there is no notification signal and neither the power rail current nor the processor current is available. A processor may implement current usage mitigation by reducing the current usage of the processor below the extended processor current threshold when there is no notification signal, the processor current is greater than the extended processor current threshold, and the power rail current is not available. A processor may implement current usage mitigation by reducing the current usage of the processor by a predetermined amount so that the current usage of the processor is below the extended processor current threshold when there is no notification signal, the power rail current is greater than the extended power rail current threshold, and the processor current is not available. A processor may implement current usage mitigation by reducing the current usage of the processor so that the power rail current is less than the extended power rail current threshold when there is no notification signal, the power rail current is greater than the extended power rail current threshold, and the processor current is greater than the extended processor current threshold.

No current usage mitigation may be implemented by a processor when there is a notification signal and the power rail current is less than the power rail current threshold, regardless of whether the processor current is available and how the processor current compares to the processor current threshold and extended processor current threshold. Similarly, no current usage mitigation may be implemented by a processor when there is a notification signal and the processor current is less than the processor current threshold, regardless of whether the power rail current is available and how the power rail current compares to the power rail current threshold and extended power rail current threshold.

A processor may implement current usage mitigation by reducing the current usage of the processor by a predetermined amount so that the power rail current is less than the extended power rail current threshold when there is a notification signal, and neither the power rail current nor the processor current is available. A processor may implement current usage mitigation by reducing the current usage of the processor proportionally to an amount by which the power rail current exceeds the power rail current threshold when there is a notification signal, the power rail current exceeds the extended power rail current threshold, and the processor current is not available. A processor may implement current usage mitigation by reducing the current usage of the processor proportionally to an amount by which the processor current exceeds the processor current threshold when there is a notification signal, the processor current exceeds the extended power rail current threshold, and the processor current is not available. A processor may implement current usage mitigation by reducing the current usage of the processor by a minimum amount by which the power rail current exceeds the power rail current or by which the processor current exceeds the processor current threshold when there is a notification signal, the power rail current exceeds the power rail current threshold, and the processor current exceeds the processor rail current threshold.

In some embodiments, the processor may select from any of the foregoing examples algorithmically, heuristically, etc. based on performance of the power management system, as long as the components to support the examples are available to the power management system.

FIGS. 6A and 6B illustrate examples of extended current threshold management for implementing various embodiments. With reference to FIGS. 1-6B, graphs 600a and 600b plot examples of current usage mitigation using different configurations of power management systems (e.g., power management system 200a-200d, 300 in FIGS. 2A-3). The graphs 600a and 600b include plots of power rail current 606, 610, of current (vertical axis) over time (horizontal axis), with respect to a power rail current threshold 604 and an extended power rail current threshold 602. The plot of power rail current 606 is for a power management system having processor electrical usage modules (e.g., processor electrical usage modules 210a-210f in FIGS. 2B-2D) and/or a power rail electrical module (e.g., power rail electrical module 212 in FIGS. 2C and 2D). The plot of power rail current 610 is for a power management system without processor electrical usage modules and a power rail electrical module. The embodiments and examples described with reference to FIGS. 6A and 6B refer to the example of measuring and limiting current for ease of explanation and clarity. However, descriptions in terms of current are not intended to limit the scope of the claims and specification because the embodiments may be implemented in terms of current, voltage, power, and/or any combination thereof.

For the graph 600*a* for a power management system having processor electrical usage modules and/or a power rail electrical module, the plot of the power rail current 606 illustrates that current prior to a time 614, at which the current usage mitigation is implemented by one or more processors (e.g., processor 14, 204*a*-204*h*, 304 in FIGS. 1-3), may be between the power rail current threshold 604 and the extended power rail current threshold 602. Once current usage mitigation begins at the time 614, the one or more processors may implement current usage mitigation using the processor electrical usage modules and/or a power rail electrical module, managing current usage of the one or more processors to reduce the power rail current 606 to less than the power rail current threshold 604. Without implementing current usage mitigation, the power rail current 608 may exceed the power rail current threshold 604. Implementing current usage mitigation using the processor electrical usage modules and/or a power rail electrical module may allow the one or more processors to maintain the power rail current 606 below and close to the power rail current threshold 604, such as within a threshold amount of current. The amount of current mitigated by the one or more processors may be dynamic based on the processor current and/or the power rail current indicated by the processor electrical usage modules and/or the power rail electrical module.

For the graph 600*b* for a power management system without processor electrical usage modules and/or a power rail electrical module, the plot of the power rail current 610 illustrates that current prior to the time 614, at which the current usage mitigation is implemented by one or more processors (e.g., processor 14, 204*a*-204*h*, 304 in FIGS. 1-3), may be between the power rail current threshold 604 and the extended power rail current threshold 602. Once commencing current usage mitigation at the time 614, the one or more processors may implement current usage mitigation without using the processor electrical usage modules and a power rail electrical module, managing current usage of the one or more processors to reduce the power rail current 610 to less than the power rail current threshold 604. Without implementing current usage mitigation, the power rail current 612 may exceed the power rail current threshold 604. Implementing current usage mitigation without using the processor electrical usage modules and a power rail electrical module may allow the one or more processors to maintain the power rail current 610 below the power rail current threshold 604. The amount of current mitigated by the one or more processors may be constant.

The dynamic current usage management illustrated in FIG. 6A may allow the power rail current 606 to be maintained below the power rail current threshold 604 in a manner that more closely adheres to the power rail current threshold 604 than the constant current usage management illustrated in FIG. 6B for the power rail current 610.

Figure 7:
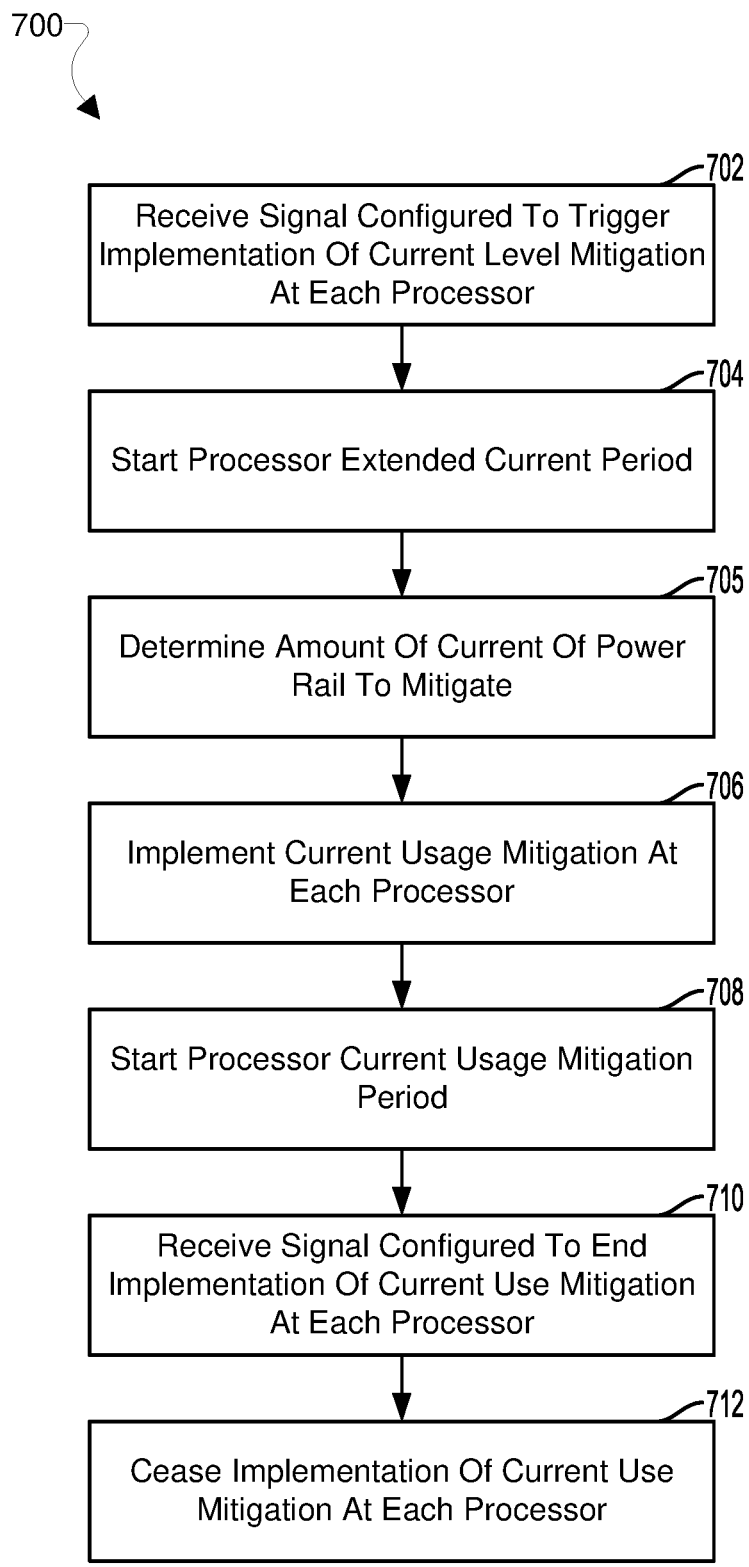
FIG. 7 is a process flow diagram illustrating a method for implementing extended electrical threshold management according to some embodiments.
Figure 8A:
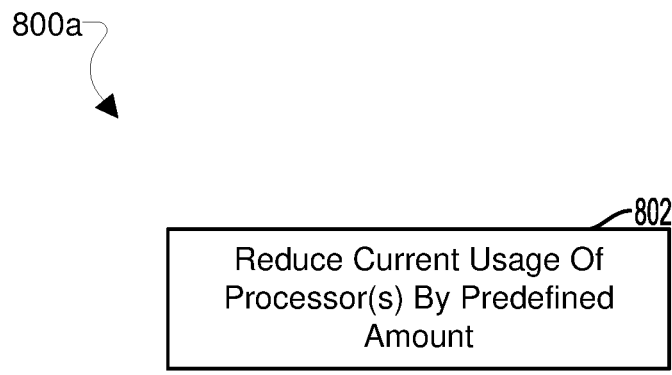
FIGS. 8A-8D are process flow diagrams illustrating methods for implementing electrical usage mitigation according to some embodiments.
Figure 8B:
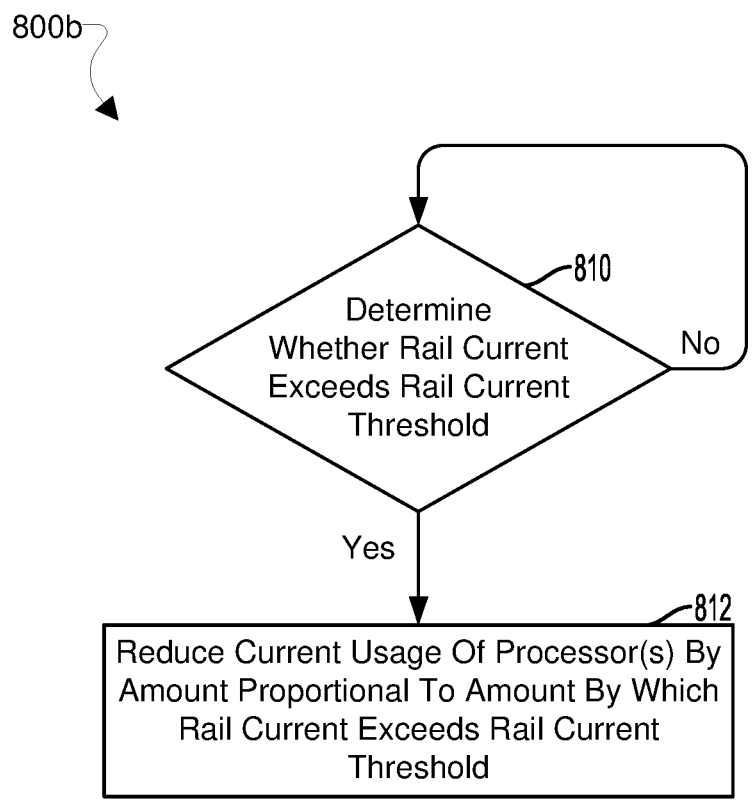
Figure 8C:
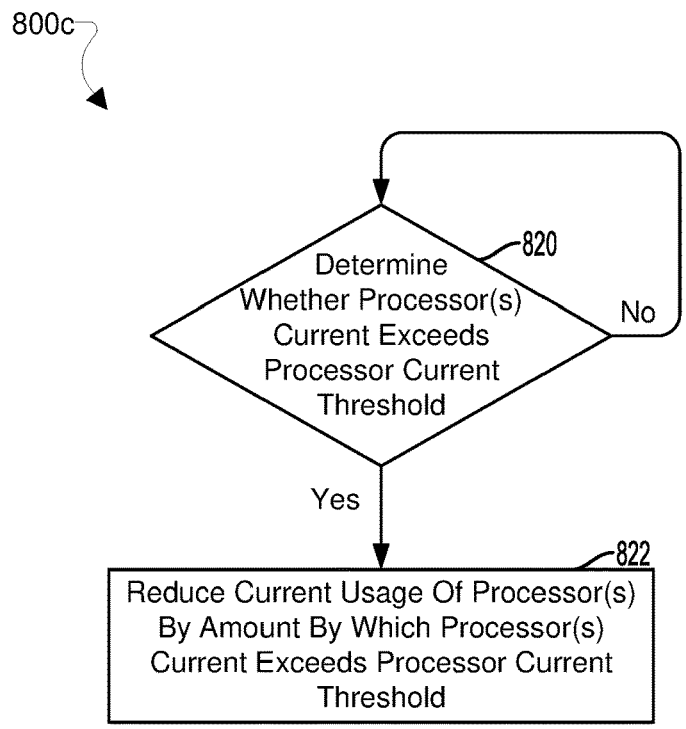
Figure 8D:
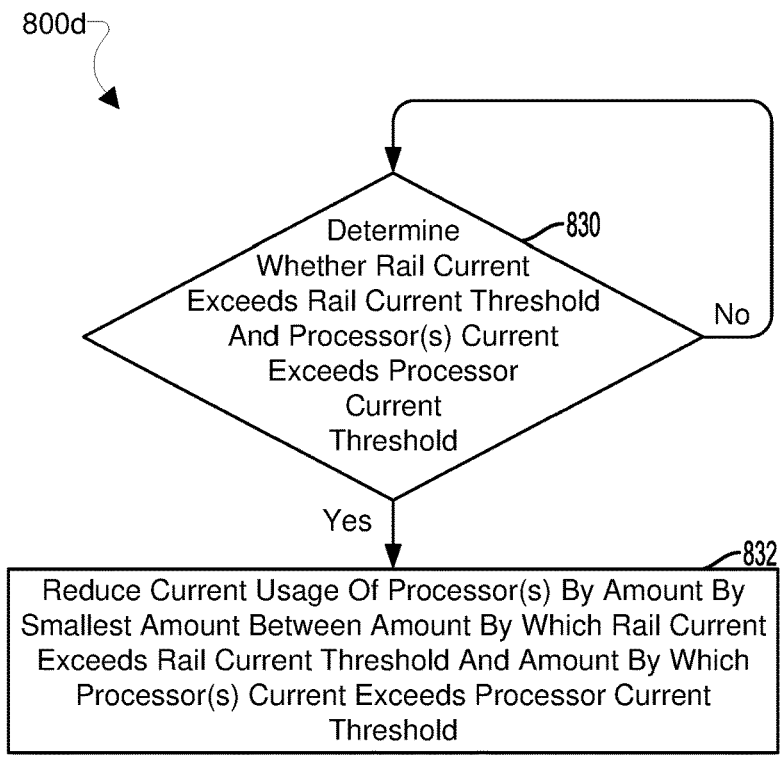

FIG. 7 illustrates a method for implementing extended current threshold management according to some embodiments. With reference to FIGS. 1-7, the method 700 may be implemented in a computing device (e.g., computing device 10 in FIG. 1), in software executing in a processor (e.g., processor 14, 204*a*-204*h*, 304 in FIGS. 1-3), in general purpose hardware, in dedicated hardware modules (e.g., electrical thresholds management module 206*a*-206*h*, electrical usage management module 208*a*-208*h* in FIGS. 2A-2D, processor electrical usage modules 210*a*-210*f* in FIGS. 2B-2D, power rail electrical module 212 in FIGS. 2C and 2D), or in a combination of a software-configured processor and dedicated hardware, such as a processor executing software within a power management system (e.g., power management system 200*a*-200*d*, 300 in FIGS. 2A-3) that includes other individual components, and various memory/cache controllers. In order to encompass the alternative configurations enabled in various embodiments, the hardware implementing the method 700 is referred to herein as a "processing device." In embodiments having dedicated power rails, the method 700 may be implemented by a single processing device per respective dedicated power rails. In embodiments having shared power rails, the method 700 may be implemented in parallel by at least two processing devices per respective shared power rails. The method 700 is described herein for one processing device for ease of explanation and clarity, which does not limit the scope of the claims or the specification.

The embodiments and examples described with reference to FIG. 7 refer to the example of measuring and limiting current for ease of explanation and clarity. However, descriptions in terms of current are not intended to limit the scope of the claims and specification because the embodiments may be implemented in terms of current, voltage, power, and/or any combination thereof.

In block 702, the processing device may receive a notification signal configured to trigger implementation of current usage mitigation at each processing device. In embodiments having dedicated power rails, the notification signal may be configured to trigger implementation of current usage mitigation at the processing device. In embodiments having shared power rails, the notification signal may be configured to trigger implementation of current usage mitigation at each of a plurality of processing devices, including the processing device. The notification signal may be received from a power manager (e.g., power manager 28, 300 in FIGS. 1-3) and be configured to indicate power states and/or power events of power rails to the processing device to prompt the processing device to respond to the signaled power states and/or events. For example, the notification signals may be configured as an interrupt signal associated with a power state and/or a power event of the power rails, such as a power state and/or a power event associated with current, voltage, and/or power exceeding a power rail current, voltage, and/or power threshold. At the processing device, the notification signal may be associated with and/or configured to trigger a set of instructions for implementing current usage mitigation by the processing device. In some embodiments, the processing device receiving the notification signal configured to trigger implementation of current usage mitigation at each processing device in block 702 may include a processor (e.g., processor 14, 204*a*-204*h*, 304 in FIGS. 1-3) and/or an electrical thresholds management module (e.g., electrical thresholds management module 206*a*-206*h* in FIGS. 2A-2D).

In block 704, the processing device may start a processing device extended current period. The processing device may measure the processing device extended current period by any of various units of measurement, such as time. The duration of the processing device extended current period may be predetermined, and the processing device extended current period may end when the duration lapses. The duration of the processing device extended current period may be designated to allow the processing device to initialize implementation of current usage mitigation in response to receiving the notification signal. In some embodiments, the processing device starting the processing device extended current period in block 704 may include the processor and/or the electrical thresholds management module.

In block 705, the processing device may determine an amount of current of a power rail to mitigate. The amount of current of the power rail to mitigate may be calculated based on a difference between a power rail current and the power rail current threshold. The power rail current may be the peak electrical usage of one or more processors 204a-204h coupled to the power rail. For example, the amount of current of the power rail to mitigate may be calculated based on a difference between the peak current usage for a process, voltage, temperature, and/or use case of the power rail based on the peak electrical usage of one or more processors and the rail current power threshold. In some embodiments, the processing device determining the amount of current of the power rail to mitigate in block 705 may include the processor and/or the electrical thresholds management module.

In block 706, the processing device may implement current usage mitigation. The aim and result of the current use mitigation process may be to reduce and/or maintain a power rail current of the one or more power rails below the power rail current threshold. In implementing the process for mitigating current use, the processing device may determine whether the current use of the processing device exceeds a processing device current threshold. In response to determining that the current use of the processing device does exceed the processor current use threshold, the processing device may mitigate current use of the processing device to reduce and/or maintain current use below the processor current threshold as described further herein for the methods 800a, 800b, 800c, 800d with reference to FIGS. 8A-8D. The processing device implementing current usage mitigation in block 706 may include the processor, the electrical thresholds management module, and/or an electrical usage management module (e.g., electrical usage management module 208a-208h in FIGS. 2A-2D).

In block 708, the processing device may start a processing device current usage mitigation period. The processing device may measure the processing device current usage mitigation period by any of various units of measurement, such as time. The duration of the processing device current usage mitigation period may be predetermined, and the processing device current usage mitigation period may end when the duration lapses. The processing device current usage mitigation period may also end in response to a designated notification signal. The duration of the processing device extended current period may be designated to allow the processing device to implement current usage mitigation in response to receiving the notification signal. In some embodiments, the processing device starting the processing device current usage mitigation period in block 708 may include the processor and/or the electrical thresholds management module.

In block 710, the processing device may receive a notification signal configured to trigger ending of current usage mitigation at each processing device. In embodiments having dedicated power rails, the notification signal may be configured to trigger suspension or ending of current usage mitigation at the processing device. In embodiments having shared power rails, the notification signal may be configured to trigger suspension or ending of current usage mitigation at each of the plurality of processing devices, including the processing device. The notification signal may be received from the power manager and be configured to indicate that the power rail current of the one or more power rails no longer exceed the power rail current threshold. Receiving the notification signal sent may trigger the processing device mitigating the current usage of the respective processing device to end the processing device current usage mitigation period and end implementing the current usage mitigation process. In some examples, the processing device receiving the notification signal configured to trigger ending of current usage mitigation at each processing device in block 710 may include the processor and/or the electrical thresholds management module.

In block 712, the processing device may cease implementation of current usage mitigation. In response to receiving the notification signal in block 710, the processing device may terminate the process for mitigating current usage at the respective processing device. The processing device may allow current usage of the respective processing device to increase above the processor current threshold rather than reducing and/or maintaining the current usage below the processor current threshold. In some examples, the processing device ceasing implementation of current usage mitigation in block 712 may include the processor, the electrical thresholds management module, the electrical usage management module.

FIGS. 8A-8D illustrate methods for implementing current usage mitigation according to some embodiments. With reference to FIGS. 1-8D, the methods 800a, 800b, 800c, 800d may be implemented in a computing device (e.g., computing device 10 in FIG. 1), in software executing in a processor (e.g., processor 14, 204a-204h, 304 in FIGS. 1-3), in general purpose hardware, in dedicated hardware modules (e.g., electrical thresholds management module 206a-206h, electrical usage management module 208a-208h in FIGS. 2A-2D, processor electrical usage modules 210a-210f in FIGS. 2B-2D, power rail electrical module 212 in FIGS. 2C and 2D), or in a combination of a software-configured processor and dedicated hardware, such as a processor executing software within a power management system (e.g., power management system 200a-200d, 300 in FIGS. 2A-3) that includes other individual components, and various memory/cache controllers. In order to encompass the alternative configurations enabled in various embodiments, the hardware implementing the methods 800a-800d is referred to herein as a "processing device." In embodiments having dedicated power rails, any of the methods 800a-800d may be implemented by a single processing device per respective dedicated power rails. In embodiments having shared power rails, any number and combination of the methods 800a-800d may be implemented in parallel by at least two processing devices per respective shared power rails. The methods 800a-800d may further describe block 706 of the method 700 described herein with reference to FIG. 7. The methods 800a-800d are described herein for one processing device for ease of explanation and clarity, which does not limit the scope of the claims or the specification.

The embodiments and examples described with reference to FIGS. 8A-8D refer to the example of measuring and limiting current for ease of explanation and clarity. However, descriptions in terms of current are not intended to limit the scope of the claims and specification because the embodiments may be implemented in terms of current, voltage, power, and/or any combination thereof.

In the method 800*a*, in block 802, the processing device may reduce the current usage of the respective processing device by a predefined amount. The predefined amount may be an amount of current associated with a process, voltage, temperature, and/or use case of the processing device at the time current usage mitigation is implemented by the processing device. The predefined amount may be retrieved from memory (e.g., memory 16, 36 in FIG. 1), such as from a stored lookup table or the like, and/or calculated using a predefined algorithm. In some examples, a process indicator may be retrieved from a fused value, a voltage may be received from a voltage manager, a temperature may be received from a temperature monitor, and/or a use case may be received from an executing software. If any of the variables for determining the current are unavailable, the determination may be made using a worst-case scenario for the variable. In some examples, the predefined amount may be an amount of current associated with a peak current of one or more power rails for a process, voltage, temperature, and/or use case of the power rail based on peak currents of one or more processing devices. In some examples, the processing device reducing the current usage of the respective processing device by the predefined amount in block 802 may be a include a processor (e.g., processor 14, 204*a*-204*h*, 304 in FIGS. 1-3), an electrical thresholds management module (e.g., electrical thresholds management module 206*a*-206*h* in FIGS. 2A-2D), and/or an electrical usage management module (e.g., electrical usage management module 208*a*-208*h* in FIGS. 2A-2D)

In the method 800*b*, in determination block 810, the processing device may determine whether a power rail current exceeds a power rail current threshold. In some examples, the power rail current may be a peak current of one or more power rails for a process, voltage, temperature, and/or use case of the power rail based on peak currents of one or more processing devices.

In embodiments having dedicated power rails, the processing device may use a representation of current measurements and/or estimations, such as a peak current, of the processing device as the power rail current in determination block 810. For example, the processing device may provide measurements and/or estimations of current usage of the respective processing device to a power rail electrical module (e.g., power rail electrical module 212 in FIGS. 2C and 2D) via a processing device electrical usage module (e.g., processor electrical usage modules 210*a*-210*f* in FIGS. 2B-2D). The power rail electrical module may generate the representation of the current measurements and/or estimations of the processing device as the power rail current and provide the power rail current to the processing device, such as to a electrical thresholds management module (e.g., electrical thresholds management module 206*a*-206*h* in FIGS. 2A-2D).

In embodiments having shared power rails, the processing device may use a representation of aggregated current measurements and/or estimations, such as peak currents, of a plurality of processing devices as the power rail current in determination block 810. For example, each of a plurality of processing devices may provide measurements and/or estimations of current usage of the respective processing devices to the power rail electrical module via processing device electrical usage modules (e.g., processor electrical usage modules 210*a*-210*f* in FIGS. 2B-2D). The power rail electrical module may generate the representation of the aggregated current measurements and/or estimations of the plurality of processing devices as the power rail current and provide the power rail current to the processing devices, such as to electrical thresholds management modules (e.g., electrical thresholds management module 206*a*-206*h* in FIGS. 2A-2D). The processing device may compare the power rail current to the power rail current threshold. In some examples, the processing device determining whether the power rail current exceeds the power rail current threshold in determination block 810 may include a processor (e.g., processor 14, 204*a*-204*h*, 304 in FIGS. 1-3) and/or an electrical thresholds management module (e.g., electrical thresholds management module 206*a*-206*h* in FIGS. 2A-2D).

In response to determining that the power rail current does not exceed the power rail current threshold (i.e., determination block 810="No"), the processing device may repeatedly and/or continually determine whether the power rail current exceeds the power rail current threshold in determination block 810. In response to determining that the power rail current exceeds the power rail current threshold (i.e., determination block 810="Yes"), the processing device may reduce the current usage of the respective processing device by an amount proportional to an amount by which the power rail current exceeds the power rail current threshold in block 812. Using the power rail current provided to the processing device by the power rail electrical module, the processing device may calculate an amount of current proportional to the power rail current exceeding the power rail current threshold, such as a percentage of the excess power rail current. The processing device may reduce current usage of current of the respective processing device by the calculated amount. In some examples, the processing device reducing the current usage of the respective processing device by the amount proportional to the amount by which the power rail current exceeds the power rail current threshold in block 812 may include the processing device, the electrical thresholds management module, and/or an electrical usage management module (e.g., electrical usage management module 208*a*-208*h* in FIGS. 2A-2D).

In the method 800*c*, in block 820, the processing device may determine whether a processing device current exceeds a processing device current threshold. The processing device may use a representation of measurements and/or estimations of the current of the processing device as the processing device current. For example, a processing device electrical usage module (e.g., processor electrical usage module 210*a*-210*f* in FIGS. 2B-2D) of the processing device may provide measurements and/or estimations of current usage of the respective processing device to an electrical thresholds management module (e.g., electrical thresholds management module 206*a*-206*h* in FIGS. 2A-2D). The current usage of the respective processing device may be a peak current of the respective processing device for a process, voltage, temperature, and/or use case of the respective processing device. The processing device may compare the processing device current to the processing device current threshold. In some examples, the processing device determining whether the processing device current exceeds the processing device current threshold in determination block 820 may include a processor (e.g., processor 14, 204*a*-204*h*, 304 in FIGS. 1-3) and/or the electrical thresholds management module.

In response to determining that the processing device current does not exceed the processing device current threshold (i.e., determination block 820="No"), the processing device may repeatedly and/or continually determine whether the processing device current exceeds the processing device current threshold in determination block 820. In response to determining that the processing device current exceeds the processing device current threshold (i.e., determination block 822="Yes"), the processing device may reduce the current usage of the respective processing device by an amount by which the processing device current exceeds the processing device current threshold in block 822. Using the processing device current provided to the processing device by the processing device electrical usage module, the processing device may calculate an amount of current the processing device current exceeds the processing device current threshold. In some examples, the processing device current may be the peak current for the processing device. The processing device may reduce current usage of current of the respective processing device by the calculated amount. In some examples, the processing device reducing the current usage of the respective processing device by the amount by which the processing device current exceeds the processing device current threshold in block 822 may include the processing device, the electrical thresholds management module, and/or an electrical usage management module (e.g., electrical usage management module 208a-208h in FIGS. 2A-2D).

In the method 800d, in block 830, the processing device may determine whether a power rail current exceeds a power rail current threshold and a processing device current exceeds a processing device current threshold. The processing device may determine whether the power rail current exceeds the power rail current threshold similarly to the description of block 810 of the method 800b and determine whether the processing device current exceeds the processing device current threshold similarly to the description of block 820 of the method 800c. In some examples, the processing device determining whether the power rail current exceeds the power rail current threshold and the processing device current exceeds the processing device current threshold in determination block 830 may include a processor (e.g., processor 14, 204a-204h, 304 in FIGS. 1-3) and/or an electrical thresholds management module (e.g., electrical thresholds management module 206a-206h in FIGS. 2A-2D).

In response to determining that the power rail current does not exceed the power rail current threshold or the processing device current does not exceed the processing device current threshold (i.e., determination block 830="No"), the processing device may repeatedly and/or continually determine whether the power rail current exceeds the power rail current threshold and the processing device current exceeds the processing device current threshold in determination block 830.

In response to determining that the power rail current exceeds the power rail current threshold and the processing device current exceeds the processing device current threshold (i.e., determination block 830="Yes"), the processing device may reduce the current usage of the respective processing device by a minimum amount between an amount by which the power rail current exceeds the power rail current threshold and an amount by which the processing device current exceeds the processing device current threshold in block 832. The processing device current may be a peak current of the processing device for a process, voltage, temperature, and/or use case of the power rail based on peak currents of the respective processing device. The power rail current may be a peak current of the power rail for a process, voltage, temperature, and/or use case of the power rail based on peak currents of one or more processing devices. In some examples, the processing device reducing the current usage of the respective processing device by the minimum amount between the amount by which the power rail current exceeds the power rail current threshold and the amount by which the processing device current exceeds the processing device current threshold in block 832 may include the processor, the electrical thresholds management module, and/or an electrical usage management module (e.g., electrical usage management module 208a-208h in FIGS. 2A-2D).

In embodiments having dedicated power rails, the processing device may use a representation of current measurements and/or estimations of the processing device as the power rail current. For example, the processing device may provide measurements and/or estimations of current usage of the respective processing device to a power rail electrical module (e.g., power rail electrical module 212 in FIGS. 2C and 2D) via a processing device electrical usage module (e.g., processor electrical usage modules 210a-210f in FIGS. 2B-2D). The power rail electrical module may generate the representation of the current measurements and/or estimations of the processing device as the power rail current and provide the power rail current to the processing device, such as to an electrical thresholds management module (e.g., electrical thresholds management module 206a-206h in FIGS. 2A-2D).

In embodiments having shared power rails, the processing device may use a representation of aggregated current measurements and/or estimations of a plurality of processing devices as the power rail current. For example, each of a plurality of processing devices may provide measurements and/or estimations of current usage of the respective processing devices to the power rail electrical module via processing device electrical usage modules (e.g., processor electrical usage modules 210a-210f in FIGS. 2B-2D). The power rail electrical module may generate the representation of the aggregated current measurements and/or estimations of the plurality of processing devices as the power rail current and provide the power rail current to the processing devices, such as to electrical thresholds management modules. The processing device may compare the power rail current to the power rail current threshold to calculate the amount by which the power rail current exceeds the power rail current threshold.

The processing device may use a representation of measurements and/or estimations of the current of the processing device as the processing device current. For example, a processing device electrical usage module of the processing device may provide measurements and/or estimations of current usage of the respective processing device to an electrical thresholds management module. The processing device may compare the processing device current to the processing device current threshold to calculate the amount by which the processing device current exceeds the processing device current threshold.

The processing device may compare the amount by which the power rail current exceeds the power rail current threshold and the amount by which the processing device current exceeds the processing device current threshold to determine which amount is less. The processing device may reduce current usage of current of the respective processing device by the determined lesser amount.

Figure 9:
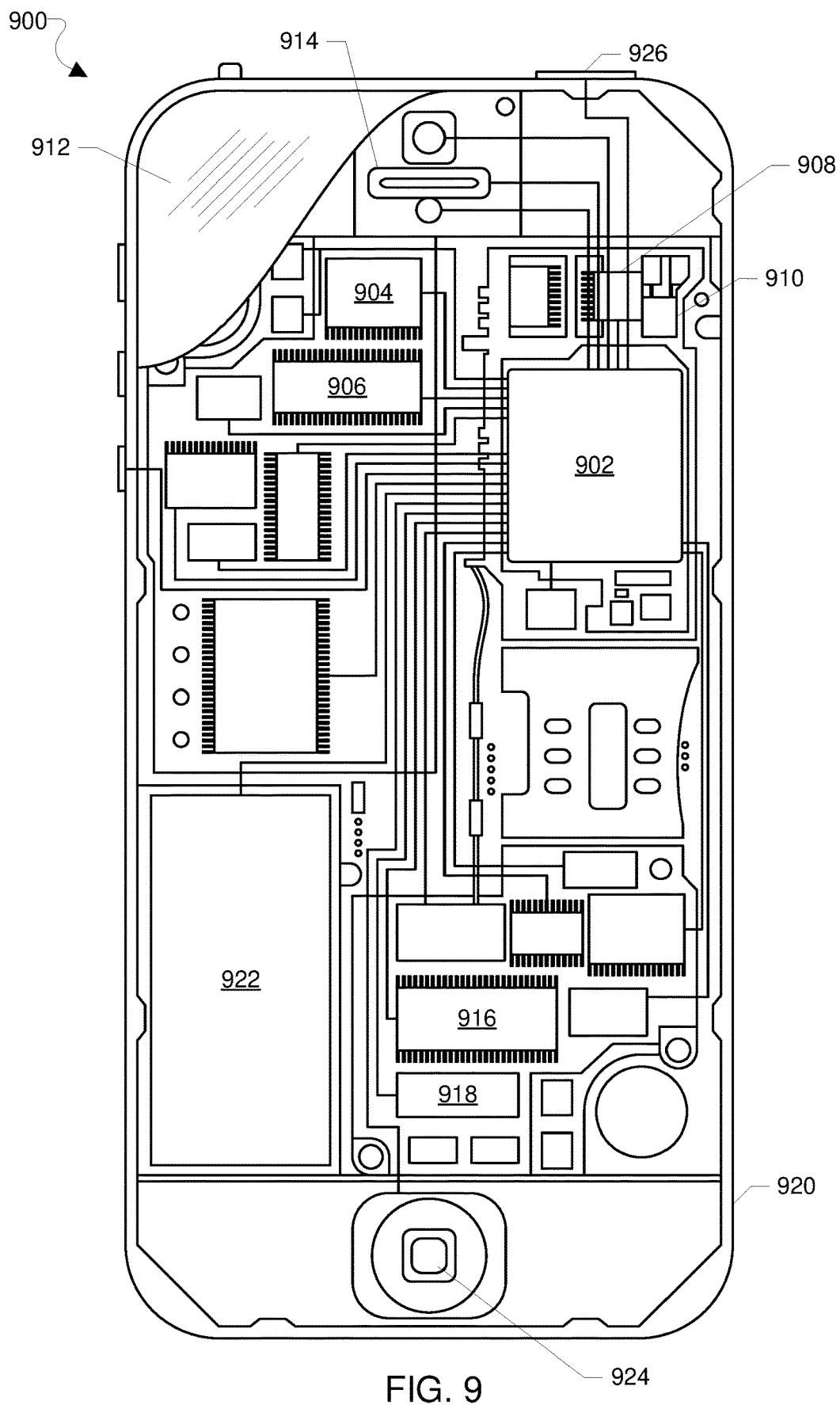
FIG. 9 is a component block diagram illustrating an example mobile computing device suitable for implementing various embodiments.

Various embodiments (including, but not limited to, embodiments described above with reference to FIGS. 1-8D) may be implemented in a wide variety of computing systems including mobile computing devices, an example of which suitable for use with the various embodiments is illustrated in FIG. 9. The mobile computing device 900 may include a processor 902 coupled to a touchscreen controller 904 and an internal memory 906. The processor 902 may be one or more multicore integrated circuits designated for general or specific processing tasks. The internal memory 906 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the mobile computing device 900 need not have touch screen capability.

The mobile computing device 900 may have one or more radio signal transceivers 908 (e.g., Peanut, Bluetooth, Zig-Bee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile computing device 900 may include a cellular network wireless modem chip 916 that enables communication via a cellular network and is coupled to the processor.

The mobile computing device 900 may include a peripheral device connection interface 918 coupled to the processor 902. The peripheral device connection interface 918 may be singularly configured to accept one type of connection, or may be configured to accept various types of physical and communication connections, common or proprietary, such as Universal Serial Bus (USB), Fire Wire, Thunderbolt, or PCIe. The peripheral device connection interface 918 may also be coupled to a similarly configured peripheral device connection port (not shown).

The mobile computing device 900 may also include speakers 914 for providing audio outputs. The mobile computing device 900 may also include a housing 920, constructed of a plastic, metal, or a combination of materials, for containing all or some of the components described herein. The mobile computing device 900 may include a power source 922 coupled to the processor 902, such as a disposable or rechargeable battery. The rechargeable battery may also be coupled to the peripheral device connection port to receive a charging current from a source external to the mobile computing device 900. The mobile computing device 900 may also include a physical button 924 for receiving user inputs. The mobile computing device 900 may also include a power button 926 for turning the mobile computing device 900 on and off.

Figure 10:
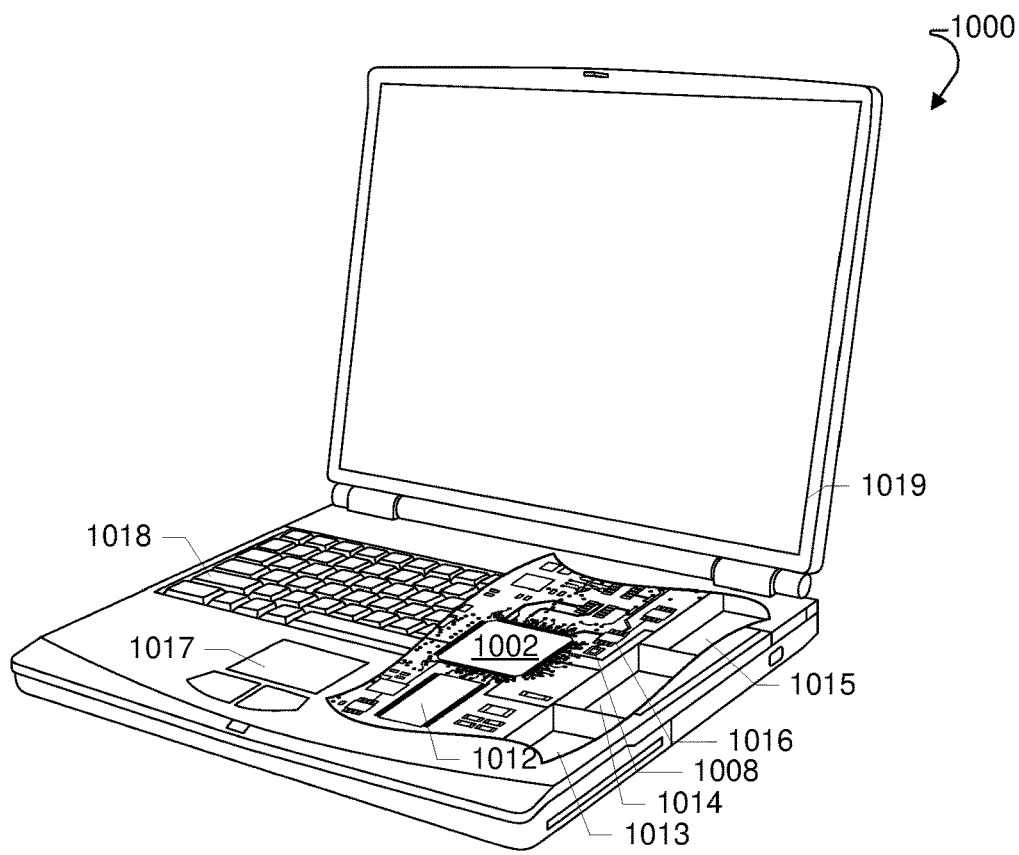
FIG. 10 is a component block diagram illustrating an example mobile computing device suitable for implementing various embodiments.

The various embodiments (including, but not limited to, embodiments described above with reference to FIGS. 1-8D) may be implemented in a wide variety of computing systems include a laptop computer 1000 an example of which is illustrated in FIG. 10. Many laptop computers include a touchpad touch surface 1017 that serves as the computer's pointing device, and thus may receive drag, scroll, and flick gestures similar to those implemented on computing devices equipped with a touch screen display and described above. A laptop computer 1000 will typically include a processor 1002 coupled to volatile memory 1012 and a large capacity nonvolatile memory, such as a disk drive 1013 of Flash memory. Additionally, the computer 1000 may have one or more antenna 1008 for sending and receiving electromagnetic radiation that may be connected to a wireless data link and/or cellular telephone transceiver 1016 coupled to the processor 1002. The computer 1000 may also include a floppy disc drive 1014 and a compact disc (CD) drive 1015 coupled to the processor 1002. In a notebook configuration, the computer housing includes the touchpad 1017, the keyboard 1018, and the display 1019 all coupled to the processor 1002. Other configurations of the computing device may include a computer mouse or trackball coupled to the processor (e.g., via a USB input) as are well known, which may also be used in conjunction with the various embodiments.

Figure 11:
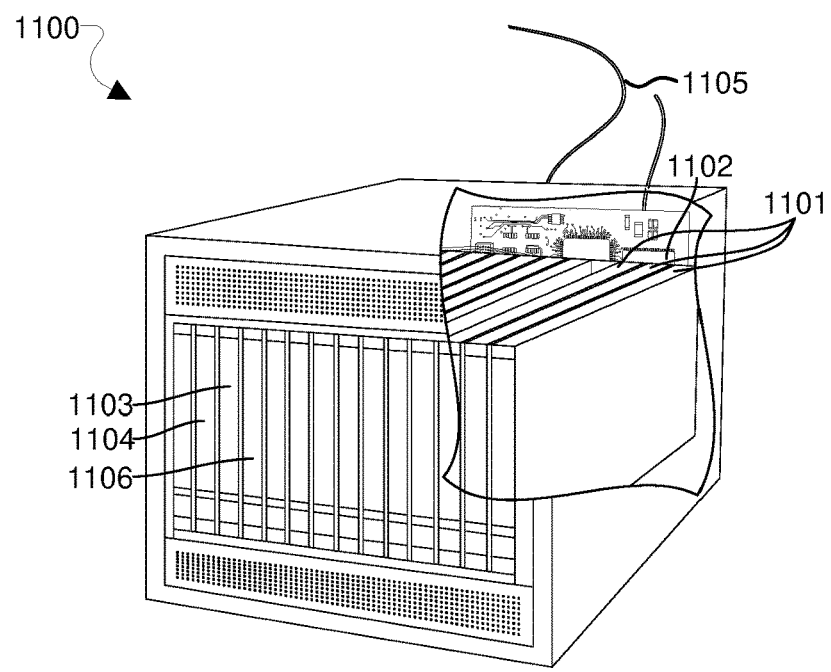
FIG. 11 is a component block diagram illustrating an example server suitable for implementing various embodiments.

The various embodiments (including, but not limited to, embodiments described above with reference to FIGS. 1-8D) may also be implemented in fixed computing systems, such as any of a variety of commercially available servers. An example server 1100 is illustrated in FIG. 11. Such a server 1100 typically includes one or more multicore processor assemblies 1101 coupled to volatile memory 1102 and a large capacity nonvolatile memory, such as a disk drive 1104. As illustrated in FIG. 11, multicore processor assemblies 1101 may be added to the server 1100 by inserting them into the racks of the assembly. The server 1100 may also include a floppy disc drive, compact disc (CD) or digital versatile disc (DVD) disc drive 1106 coupled to the processor 1101. The server 1100 may also include network access ports 1103 coupled to the multicore processor assemblies 1101 for establishing network interface connections with a network 1105, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Computer program code or "program code" for execution on a programmable processor for carrying out operations of the various embodiments may be written in a high level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Implementation examples are described in the following paragraphs. While some of the following implementation examples are described in terms of an example computing device memory system, further example implementations may include: the example functions of the computing device memory system discussed in the following paragraphs implemented as methods of the following implementation examples; and the example computing device memory system discussed in the following paragraphs implemented by a computing device memory system including means for performing functions of the computing device memory system of the following implementation examples.

Example 1. A method implemented in a computer power management system, including: receiving, at at least one processor from a power management integrated circuit, a notification signal triggering the at least one processor to implement power usage mitigation at the at least one processor; determining, by the at least one processor, a mitigation amount of power rail power by which to mitigate power usage at a power rail based on a use case for the power rail; and implementing, by the at least one processor, power usage mitigation at the at least one processor by the at least one processor sufficient to mitigate power usage at the power rail by the mitigation amount of power rail.

Example 2. The method of example 1, further including determining, by the at least one processor, whether a processor current of the at least one processor exceeds a processor current threshold, in which implementing power usage mitigation at the at least one processor includes implementing current usage mitigation at the at least one processor in response to determining that the processor current of the at least one processor exceeds the processor current threshold.

Example 3. The method of either of examples 1 or 2, in which implementing the power usage mitigation at the at least one processor includes reducing current usage of the at least one processor by a predefined amount sufficient to reduce a power rail current to less than a power rail current threshold.

Example 4. The method of either of examples 1 or 2, in which implementing the power usage mitigation at the at least one processor includes reducing current usage of the at least one processor by an amount proportional to an amount by which a power rail current exceeds a power rail current threshold.

Example 5. The method of either of examples 1 or 2, in which implementing the power usage mitigation at the at least one processor includes reducing current usage of the at least one processor by an amount by which a processor current of the at least one processor exceeds a processor current threshold.

Example 6. The method of either of examples 1 or 2, in which implementing the power usage mitigation at the at least one processor includes reducing current usage of the at least one processor by a smallest amount between an amount by which a power rail current exceeds a power rail current threshold and an amount by which a processor current of the at least one processor exceeds a processor current threshold.

Example 7. The method of either of examples 1 or 2, in which implementing the power usage mitigation at the at least one processor includes reducing current usage of the at least one processor by one or a combination of reducing a frequency of the at least one processor and reducing a workload of the at least one processor.

Example 9. The method of either of examples 1 or 2, in which implementing the power usage mitigation at the at least one processor includes allowing any current usage of the at least one processor for a power rail current up to an extended rail current threshold.

Example 10. The method of either of examples 1 or 2, in which implementing the power usage mitigation at the at least one processor includes allowing current usage of the at least one processor to exceed a processor current threshold up to an extended processor current threshold.

Example 11. The method of any of examples 1-10, in which implementing the power usage mitigation at the at least one processor includes implementing the power usage mitigation within a processor power usage mitigation period.

Example 12. The method of any of examples 1-11, in which: receiving the notification signal triggering the at least one processor to implement power usage mitigation at the at least one processor includes receiving, at a plurality of processors from the power management integrated circuit, the notification signal triggering the plurality of processor to implement power usage mitigation at each respective processor of the plurality of processors, in which the plurality of processors includes the at least one processor; determining the mitigation amount of power rail power by which to mitigate power usage at the power rail based on the use case for the power rail comprises determining, by the respective processors of the plurality of processors, the mitigation amount of power rail power by which to mitigate power usage at the power rail based on the use case for the power rail; and implementing the power usage mitigation at the at least one processor sufficient to mitigate power usage at the power rail by the mitigation amount of power rail power includes implementing the power usage mitigation at respective processors of the plurality of processors sufficient to mitigate power usage at the power rail by the mitigation amount of power rail power.

Example 13. The method of any of examples 1-12, further including: monitoring power transmitted through the power rail by the power management integrated circuit; and sending the notification signal to the at least one processor in response to power transmitted through the power rail exceeding a threshold.

Example 14. The method of either of examples 1 or 2, in which implementing the power usage mitigation at the at least one processor includes reducing one of current, voltage, or current and voltage applied to the at least one processor by a predefined amount sufficient to reduce power in a power rail to less than a power rail power threshold.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method implemented in a computer power management system, comprising:
receiving, at at least one processor from a power management integrated circuit, a notification signal triggering the at least one processor to implement power usage mitigation at the at least one processor;
determining, by the at least one processor, a mitigation amount of power rail power by which to mitigate power usage at a power rail based on a use case for the power rail; and
implementing, by the at least one processor, power usage mitigation at the at least one processor sufficient to mitigate power usage at the power rail by the mitigation amount of power rail.

2. The method of claim 1, further comprising determining, by the at least one processor, whether a processor current of the at least one processor exceeds a processor current threshold, wherein implementing power usage mitigation at the at least one processor comprises implementing current usage mitigation at the at least one processor in response to determining that the processor current of the at least one processor exceeds the processor current threshold.

3. The method of claim 1, wherein implementing the power usage mitigation at the at least one processor comprises reducing current usage of the at least one processor by a predefined amount sufficient to reduce a power rail current to less than a power rail current threshold.

4. The method of claim 1, wherein implementing the power usage mitigation at the at least one processor comprises reducing current usage of the at least one processor by an amount proportional to an amount by which a power rail current exceeds a power rail current threshold.

5. The method of claim 1, wherein implementing the power usage mitigation at the at least one processor comprises reducing current usage of the at least one processor by an amount by which a processor current of the at least one processor exceeds a processor current threshold.

6. The method of claim 1, wherein implementing the power usage mitigation at the at least one processor comprises reducing current usage of the at least one processor by a smallest amount between an amount by which a power rail current exceeds a power rail current threshold and an amount by which a processor current of the at least one processor exceeds a processor current threshold.

7. The method of claim 1, wherein implementing the power usage mitigation at the at least one processor comprises implementing the power usage mitigation within a processor current usage mitigation period.

8. The method of claim 1, wherein implementing the power usage mitigation at the at least one processor comprises reducing current usage of the at least one processor by one or a combination of reducing a frequency of the at least one processor and reducing a workload of the at least one processor.

9. The method of claim 1, wherein implementing the power usage mitigation at the at least one processor comprises allowing any current usage of the at least one processor for a power rail current up to an extended rail current threshold.

10. The method of claim 1, wherein implementing the power usage mitigation at the at least one processor comprises allowing current usage of the at least one processor to exceed a processor current threshold up to an extended processor current threshold.

11. The method of claim 1, wherein:
receiving the notification signal triggering the at least one processor to implement power usage mitigation at the at least one processor comprises receiving, at a plurality of processors from the power management integrated circuit, the notification signal triggering the plurality of processors to implement power usage mitigation at each respective processor of the plurality of processors, wherein the plurality of processors includes the at least one processor;
determining the mitigation amount of power rail power by which to mitigate power usage at the power rail based on the use case for the power rail comprises determining, by the respective processors of the plurality of processors, the mitigation amount of power rail power by which to mitigate power usage at the power rail based on the use case for the power rail; and
implementing the power usage mitigation at the at least one processor sufficient to mitigate power usage at the power rail by the mitigation amount of power rail power comprises implementing the power usage mitigation at the respective processors of the plurality of processors sufficient to mitigate power usage at the power rail by the mitigation amount of power rail power.

12. The method of claim 1, further comprising:
monitoring power transmitted through the power rail by the power management integrated circuit; and
sending the notification signal to the at least one processor in response to power transmitted through the power rail exceeding a threshold.

13. The method of claim 1, wherein implementing the power usage mitigation at the at least one processor comprises reducing one of current, voltage, or current and voltage applied to the at least one processor by a predefined amount sufficient to reduce power in a power rail to less than a power rail power threshold.

14. A computing device, comprising:
a computer power management system comprising a power management integrated circuit; and
at least one processor coupled to the power management integrated circuit and configured to:
receive from the power management integrated circuit a notification signal for triggering power usage mitigation at the at least one processor;
determine a mitigation amount of power rail power by which to mitigate power usage at a power rail based on a use case for the power rail; and
implement power usage mitigation at the at least one processor sufficient to mitigate power usage at the power rail by the mitigation amount of power rail power in response to the notification signal.

15. The computing device of claim 14, wherein the at least one processor is configured to determine whether a processor current of the at least one processor exceeds a processor current threshold,
wherein implementing power usage mitigation at the at least one processor comprises implementing current usage mitigation at the at least one processor in response to determining that the processor current of the at least one processor exceeds the processor current threshold.

16. The computing device of claim 14, wherein the at least one processor is configured to implement the power usage mitigation comprising a current usage mitigation that reduces current usage of the at least one processor by a predefined amount sufficient to reduce a power rail current to less than a power rail current threshold.

17. The computing device of claim 14, wherein the at least one processor is configured to implement the power usage mitigation comprising a current usage mitigation that reduces current usage of the at least one processor by an amount proportional to an amount by which a power rail current exceeds a power rail current threshold.

18. The computing device of claim 14, wherein the at least one processor is configured to implement the power usage mitigation comprising a current usage mitigation that reduces current usage of the at least one processor by an amount by which a processor current of the at least one processor exceeds a processor current threshold.

19. The computing device of claim 14, wherein the at least one processor is configured to implement the power usage mitigation comprising a current usage mitigation that reduces current usage of the at least one processor by a smallest amount between an amount by which a power rail current exceeds a power rail current threshold and an amount by which a processor current of the at least one processor exceeds a processor current threshold.

20. The computing device of claim 14, wherein the at least one processor is configured to implement the power usage mitigation comprising a current usage mitigation within a processor current usage mitigation period.

21. The computing device of claim 14, wherein the at least one processor is configured to implement the power usage mitigation comprising a current usage mitigation that reduces current usage of the at least one processor by one or a combination of reducing a frequency of the at least one processor and reducing a workload of the at least one processor.

22. The computing device of claim 14, wherein the at least one processor is configured to implement the power usage mitigation comprising a current usage mitigation that allows any current usage of the at least one processor for a power rail current up to an extended rail current threshold.

23. The computing device of claim 14, wherein the at least one processor is configured to implement the power usage mitigation comprising a current usage mitigation that allows current usage of the at least one processor to exceed a processor current threshold up to an extended processor current threshold.

24. The computing device of claim 14, wherein the computing device comprises a plurality of processors each of which is configured to receive the notification signal, determine the mitigation amount of power rail power by which to mitigate power usage at the power rail based on the use case for the power rail, and implement power usage mitigation sufficient to mitigate power usage at the power rail by the mitigation amount of power rail power in response to the notification signal.

25. The computing device of claim 14, further comprising:
monitoring power transmitted through the power rail by the power management integrated circuit; and
sending the notification signal to the at least one processor in response to power transmitted through the power rail exceeding a threshold.

26. The computing device of claim 14, wherein the at least one processor is configured to implement the power usage mitigation that reduces one of current, voltage, or current and voltage applied to the at least one processor by a predefined amount sufficient to reduce power in a power rail to less than a power rail power threshold.

27. A computing device, comprising:
at least one processor;
means for receiving at the at least one processor a notification signal triggering the at least one processor to implement power usage mitigation at the at least one processor;
means for determining a mitigation amount of power rail power by which to mitigate power usage at a power rail based on a use case for the power rail; and
means for implementing power usage mitigation at the at least one processor sufficient to mitigate power usage at the power rail by the mitigation amount of power rail power in response to the notification signal.

28. The computing device of claim 27, further comprising means for determining whether a processor current of the at least one processor exceeds a processor current threshold,
wherein means for implementing power usage mitigation at the at least one processor comprises means for implementing current usage mitigation at the at least one processor in response to determining that the processor current of the at least one processor exceeds the processor current threshold.

29. The computing device of claim 27, wherein means for implementing the power usage mitigation at the at least one processor comprises one of means for reducing current usage of the at least one processor by a predefined amount sufficient to reduce a power rail current to less than a power rail current threshold, means for reducing current usage of the at least one processor by an amount proportional to an amount by which a power rail current exceeds a power rail current threshold, means for reducing current usage of the at least one processor by an amount by which a processor current of the at least one processor exceeds a processor current threshold, or means for reducing current usage of the at least one processor by a smallest amount between an amount by which a power rail current exceeds a power rail current threshold and an amount by which a processor current of the at least one processor exceeds a processor current threshold.

30. The computing device of claim 27, wherein means for implementing the power usage mitigation at the at least one processor comprises means for implementing the current usage mitigation within a processor current usage mitigation period.

\* \* \* \* \*